(12) United States Patent
Clancy et al.

(10) Patent No.: US 9,476,202 B2
(45) Date of Patent: Oct. 25, 2016

(54) FOAM BOARD WITH PRE-APPLIED SEALING MATERIAL

(75) Inventors: Timothy Robert Clancy, Swanton, OH (US); John Frank Budinscak, Jr., Wadsworth, OH (US); Lee John Burlingame, Toledo, OH (US)

(73) Assignee: OWENS CORNING INTELLECTUAL CAPITAL LLC, Toledo, OH (US)

(*) Notice: Subject to any disclaimer, the term of this patent is extended or adjusted under 35 U.S.C. 154(b) by 0 days.

(21) Appl. No.: 13/073,170

(22) Filed: Mar. 28, 2011

(65) Prior Publication Data

US 2012/0247042 A1 Oct. 4, 2012

(51) Int. Cl.
*E04C 2/52* (2006.01)
*E04C 2/24* (2006.01)
*E04F 13/08* (2006.01)
*E04B 1/61* (2006.01)
(Continued)

(52) U.S. Cl.
CPC ............ *E04C 2/528* (2013.01); *E04B 1/6104* (2013.01); *E04B 1/6125* (2013.01); *E04B 1/6812* (2013.01); *E04B 2/7457* (2013.01); *E04C 2/24* (2013.01); *E04F 13/0803* (2013.01); *E04F 13/0892* (2013.01); *E04F 13/0894* (2013.01); *E04F 13/0898* (2013.01); *E04B 2/707* (2013.01); *E04B 2001/2481* (2013.01); *Y10T 29/49623* (2015.01)

(58) Field of Classification Search
CPC .. E04B 1/6104; E04B 1/6125; E04B 1/6812; E04B 2/7457; E04B 2/707; E04B 2001/2481; E04C 2/24; E04C 2/528; E04F 13/0803; E04F 13/0892; E04F 13/0894; E04F 13/0898

USPC ............... 52/309.4, 408, 483.1, 578, 717.05, 52/783.1
See application file for complete search history.

(56) References Cited

U.S. PATENT DOCUMENTS 4,025,686 A * 5/1977 Zion .............................. 442/373
4,075,805 A * 2/1978 Bongiovanni ............. 52/309.12
(Continued)

FOREIGN PATENT DOCUMENTS

CN 1149096 5/1997
CN 200992767 12/2007
(Continued)

OTHER PUBLICATIONS

Owens Corning brochure, CodeBord Exterior Insulating Sheathing CodeBord Air Barrier System, 4 pgs., Jul. 2007.
(Continued)

*Primary Examiner* — Rodney Mintz
(74) *Attorney, Agent, or Firm* — Calfee, Halter & Grisworld LLP

(57) ABSTRACT

A board with preformed seals. In an exemplary embodiment, a sealing material is applied to at least one edge of a board to form a preformed seal on that edge. The board is configured such that when the board is attached to a frame adjacent to a another board, at least a portion of the sealing material applied to the edge of the board seals against at least a portion of an edge another board. In one exemplary embodiment, the boards are configured to seal against edges of substantially identical boards. A plurality of the sheathing boards may be installed on a building frame to form a sheathing system that provides a moisture and/or gas barrier between and interior and exterior of a building.

20 Claims, 26 Drawing Sheets

(51) Int. Cl.
*E04B 1/68* (2006.01)
*E04B 2/74* (2006.01)
*E04B 2/70* (2006.01)
*E04B 1/24* (2006.01)

(56) References Cited

U.S. PATENT DOCUMENTS

| | | | |
|---|---|---|---|
| 4,107,892 A | 8/1978 | Bellem | |
| 4,121,958 A * | 10/1978 | Koonts | 156/79 |
| 4,232,494 A | 11/1980 | Bauch et al. | |
| 4,244,151 A * | 1/1981 | Seem | 52/60 |
| 4,564,554 A * | 1/1986 | Mikuski | 428/292.4 |
| 4,687,534 A * | 8/1987 | Alford et al. | 156/308.6 |
| 4,769,963 A * | 9/1988 | Meyerson | 52/309.9 |
| 5,086,599 A * | 2/1992 | Meyerson | 52/309.9 |
| 5,092,095 A * | 3/1992 | Zadok et al. | 52/588.1 |
| 5,343,665 A * | 9/1994 | Palmersten | 52/588.1 |
| 5,349,796 A * | 9/1994 | Meyerson | E04B 1/14 52/309.11 |
| 5,354,402 A * | 10/1994 | Luetkens et al. | 156/244.11 |
| 5,394,672 A * | 3/1995 | Seem | 52/794.1 |
| 5,448,865 A * | 9/1995 | Palmersten | 52/309.9 |
| 5,502,939 A * | 4/1996 | Zadok et al. | 52/309.9 |
| 5,628,158 A * | 5/1997 | Porter | 52/309.9 |
| 5,756,179 A * | 5/1998 | Jutte | 428/69 |
| 5,834,082 A * | 11/1998 | Day | 428/56 |
| 5,968,615 A * | 10/1999 | Schlappa | E04B 1/948 428/192 |
| 6,139,945 A * | 10/2000 | Krejchi et al. | 428/317.9 |
| 6,158,191 A * | 12/2000 | Seem | 52/746.11 |
| 6,247,281 B1 * | 6/2001 | Lin | 52/309.4 |
| 6,314,701 B1 * | 11/2001 | Meyerson | 52/588.1 |
| 6,581,348 B2 | 6/2003 | Hunter, Jr. | |
| 6,715,249 B2 | 4/2004 | Rusek et al. | |
| 6,922,965 B2 * | 8/2005 | Rosenthal et al. | 52/592.1 |
| 6,968,659 B2 | 11/2005 | Boyer | |
| 7,021,018 B2 * | 4/2006 | Peng | 52/549 |
| 7,029,741 B2 * | 4/2006 | Sjoberg et al. | 428/60 |
| 7,036,285 B2 * | 5/2006 | Hunter, Jr. | 52/746.11 |
| 7,146,771 B2 * | 12/2006 | Swann | 52/518 |
| 7,168,221 B2 * | 1/2007 | Hunter, Jr. | 52/746.11 |
| 7,188,456 B2 * | 3/2007 | Knauseder | 52/592.1 |
| 7,441,384 B2 * | 10/2008 | Miller et al. | 52/589.1 |
| 7,644,553 B2 * | 1/2010 | Knauseder | 52/588.1 |
| 7,934,353 B2 * | 5/2011 | Dhellemmes et al. | 52/783.1 |
| 8,112,966 B2 * | 2/2012 | Bowe et al. | 52/745.05 |
| 8,151,538 B2 * | 4/2012 | Bowe et al. | 52/745.05 |
| 8,286,399 B2 * | 10/2012 | Brown | 52/404.4 |
| 8,314,161 B2 * | 11/2012 | Polasky et al. | 521/139 |
| 8,440,296 B2 * | 5/2013 | Kipp et al. | 428/318.4 |
| 8,522,500 B1 * | 9/2013 | Brown | 52/404.4 |
| 8,524,792 B2 * | 9/2013 | Polasky et al. | 521/139 |
| 8,671,645 B1 * | 3/2014 | Shriver | 52/741.4 |
| 8,875,462 B2 * | 11/2014 | Brown | E04B 1/14 52/404.4 |
| 9,010,057 B2 * | 4/2015 | Trebor-MacConnell | E04F 13/0866 52/483.1 |
| 9,267,285 B2 * | 2/2016 | Tauferner | B32B 5/02 52/309.14 |
| 2002/0148551 A1 * | 10/2002 | Knauseder | 156/182 |
| 2002/0189185 A1 * | 12/2002 | Hunter, Jr. | 52/408 |
| 2003/0041544 A1 * | 3/2003 | Rusek et al. | 52/481.1 |
| 2004/0031226 A1 * | 2/2004 | Miller et al. | 52/588.1 |
| 2004/0031227 A1 * | 2/2004 | Knauseder | 52/592.1 |
| 2004/0043682 A1 * | 3/2004 | Taylor et al. | 442/42 |
| 2004/0148894 A1 | 8/2004 | Kelley et al. | |
| 2006/0096223 A1 * | 5/2006 | Kyoung Taek | 52/578 |
| 2006/0165940 A1 * | 7/2006 | Sjoberg et al. | 428/57 |
| 2006/0183387 A1 * | 8/2006 | Taylor et al. | 442/30 |
| 2007/0043131 A1 * | 2/2007 | Polasky et al. | 521/79 |
| 2007/0125042 A1 * | 6/2007 | Hughes et al. | 52/782.1 |
| 2007/0149628 A1 * | 6/2007 | Delaviz et al. | 521/79 |
| 2007/0175172 A1 * | 8/2007 | Sousa | 52/741.1 |
| 2007/0261340 A1 | 11/2007 | Cecilio et al. | |
| 2008/0086965 A1 | 4/2008 | Metz et al. | |
| 2008/0216426 A1 * | 9/2008 | Bunker | 52/285.3 |
| 2009/0107080 A1 | 4/2009 | Bowe et al. | |
| 2009/0107611 A1 * | 4/2009 | Bowe et al. | 156/60 |
| 2009/0139181 A1 | 6/2009 | Bowe et al. | |
| 2009/0308001 A1 * | 12/2009 | Wu et al. | 52/173.3 |
| 2010/0095613 A1 | 4/2010 | Paetkau et al. | |
| 2010/0095625 A1 | 4/2010 | Boutaghou et al. | |
| 2010/0175810 A1 * | 7/2010 | Korwin-Edson et al. | 156/71 |
| 2011/0030300 A1 * | 2/2011 | Liu | 52/403.1 |
| 2011/0120038 A1 * | 5/2011 | Wormann et al. | 52/309.4 |
| 2011/0173925 A1 * | 7/2011 | Brown | 52/794.1 |
| 2012/0073225 A1 * | 3/2012 | Douglass | 52/309.4 |
| 2012/0148812 A1 * | 6/2012 | Kipp et al. | 428/213 |
| 2013/0030069 A1 * | 1/2013 | Polasky et al. | 521/139 |
| 2013/0067841 A1 * | 3/2013 | Grieco et al. | 52/309.4 |
| 2013/0111838 A1 * | 5/2013 | Commerford | 52/309.4 |
| 2013/0227902 A1 * | 9/2013 | Van Sloun et al. | 52/309.4 |
| 2013/0312347 A1 * | 11/2013 | Milostic et al. | 52/404.1 |
| 2013/0316143 A1 * | 11/2013 | Budinscak et al. | 428/159 |
| 2013/0318897 A1 * | 12/2013 | Conterno | 52/232 |
| 2013/0330492 A1 * | 12/2013 | Rogers et al. | 428/40.1 |
| 2014/0000203 A1 * | 1/2014 | Brown | 52/404.4 |
| 2014/0011899 A1 * | 1/2014 | Polasky et al. | 521/139 |
| 2015/0128517 A1 * | 5/2015 | Tauferner | B32B 5/02 52/309.14 |
| 2015/0353776 A1 * | 12/2015 | Gawryla | B32B 37/12 442/1 |

FOREIGN PATENT DOCUMENTS

| | | |
|---|---|---|
| CN | 201627320 | 11/2010 |
| DE | 102008035414 A1 * | 2/2010 |
| EP | 255683 A1 * | 2/1988 |
| EP | 705999 A1 * | 4/1996 |
| JP | H0949269 | 2/1997 |
| JP | H10159194 | 6/1998 |
| JP | 2000345653 | 12/2000 |
| JP | 2005330664 | 12/2005 |
| WO | WO 2011151850 A1 * | 12/2011 |

OTHER PUBLICATIONS

Owens Corning brochure, Extruded Polystyrene insulation FormulaR . . . in Residential Residing, 2 pgs., Jan. 2003.
Owens Corning brochure, PROPINK Reinforced Insulating Sheathing Product Data Sheet, 2 pgs., 2006.
ASTM International Designation: E2357-05, "Standard Test Method for Determining Air Leakage of Air Barrier Assemblies", 11 pgs., 2005.
Office action from Chinese Application No. 201210169276.3 dated Jun. 3, 2015.
Office action from Chinese Application No. 201210169276.3 dated Jan. 18, 2016.
Office action from Chinese Application No. 201210169276.3 dated Jun. 2, 2016.

* cited by examiner

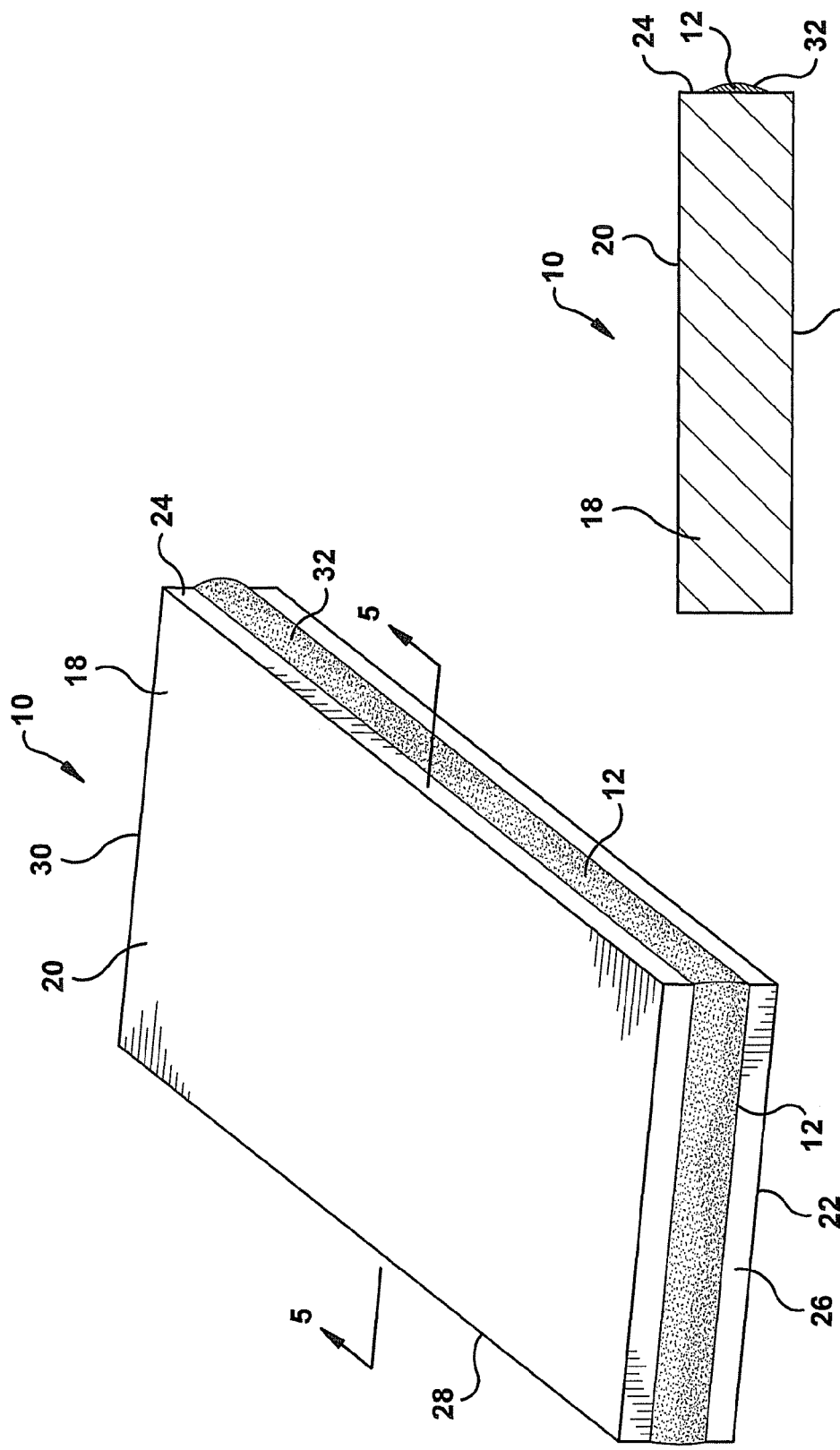

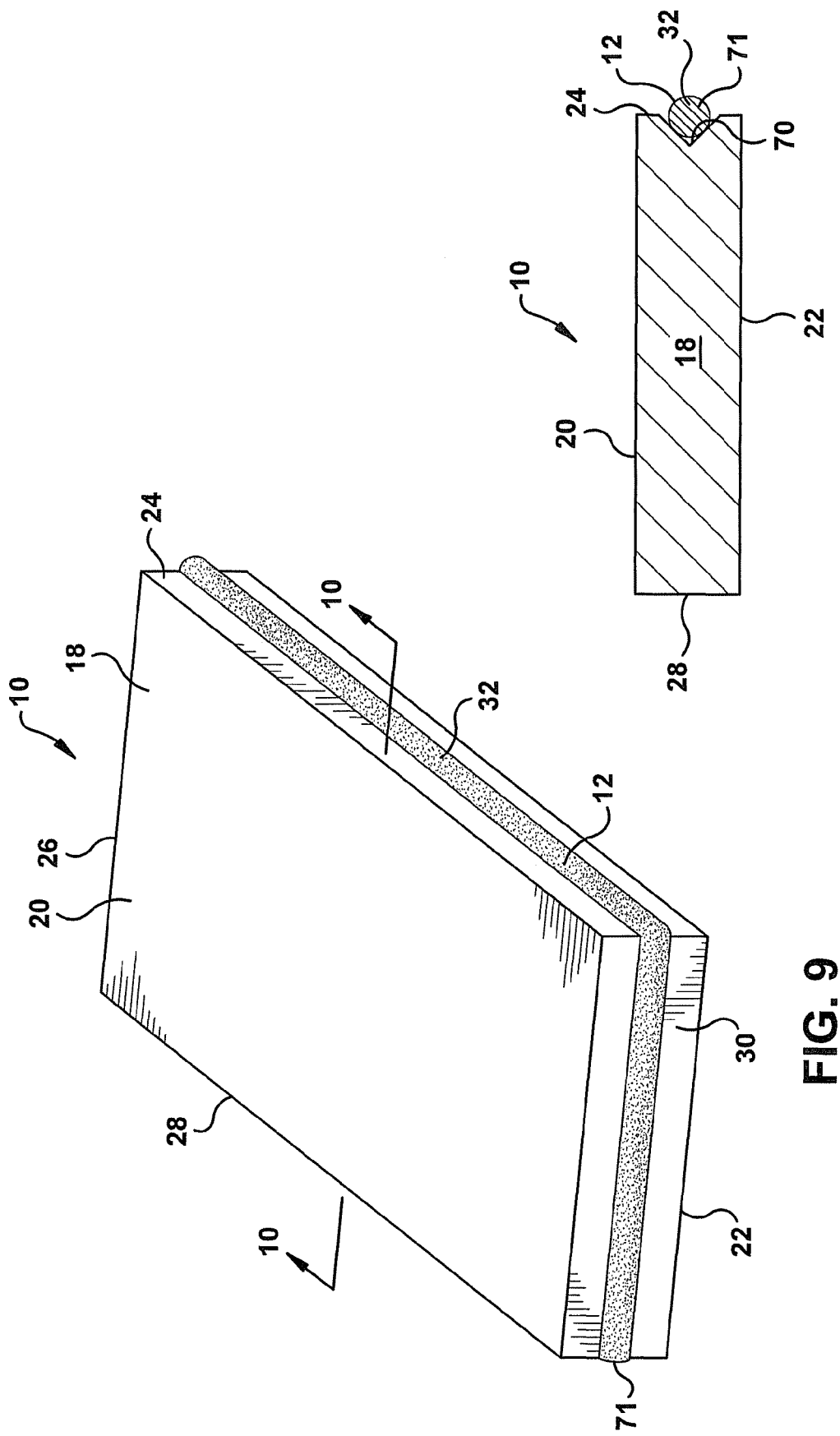

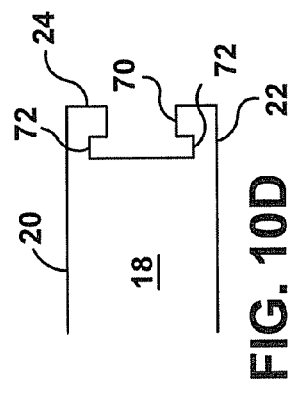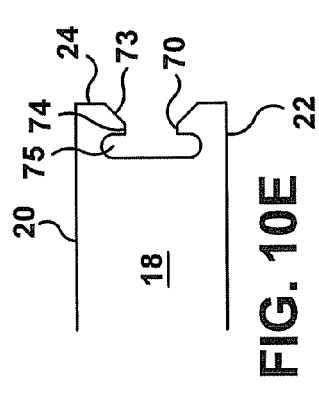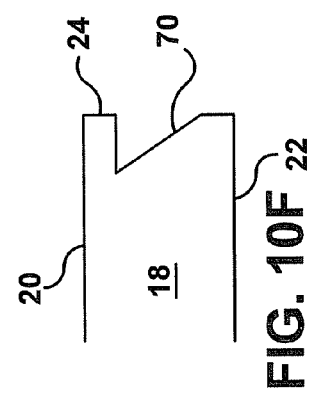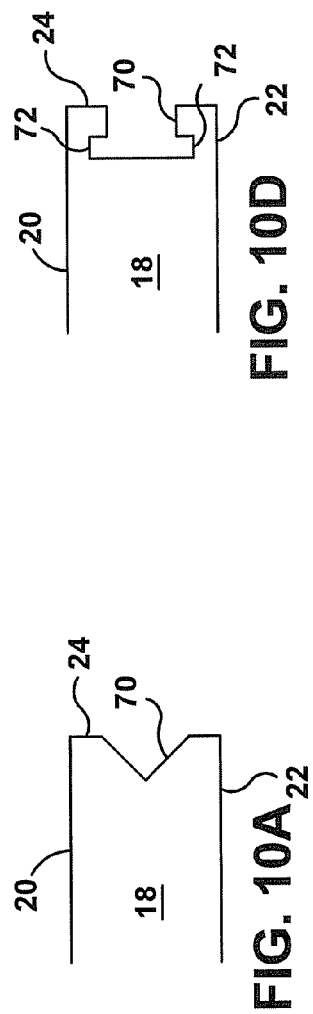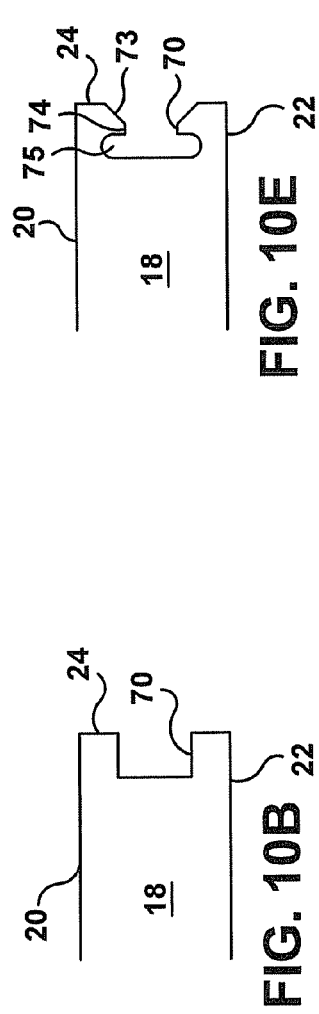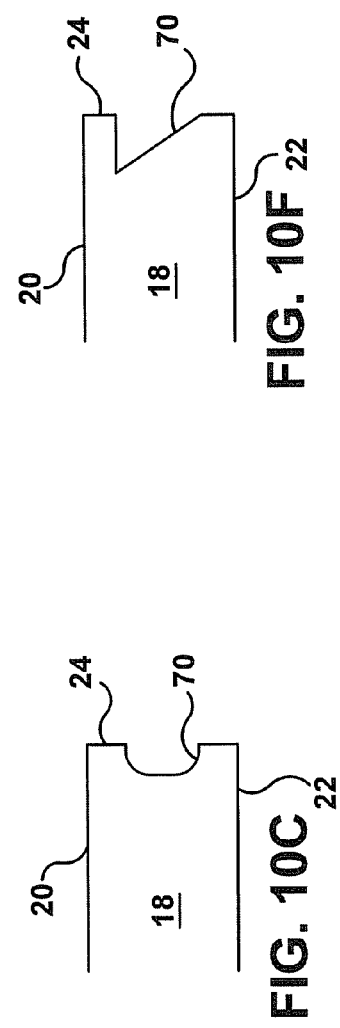

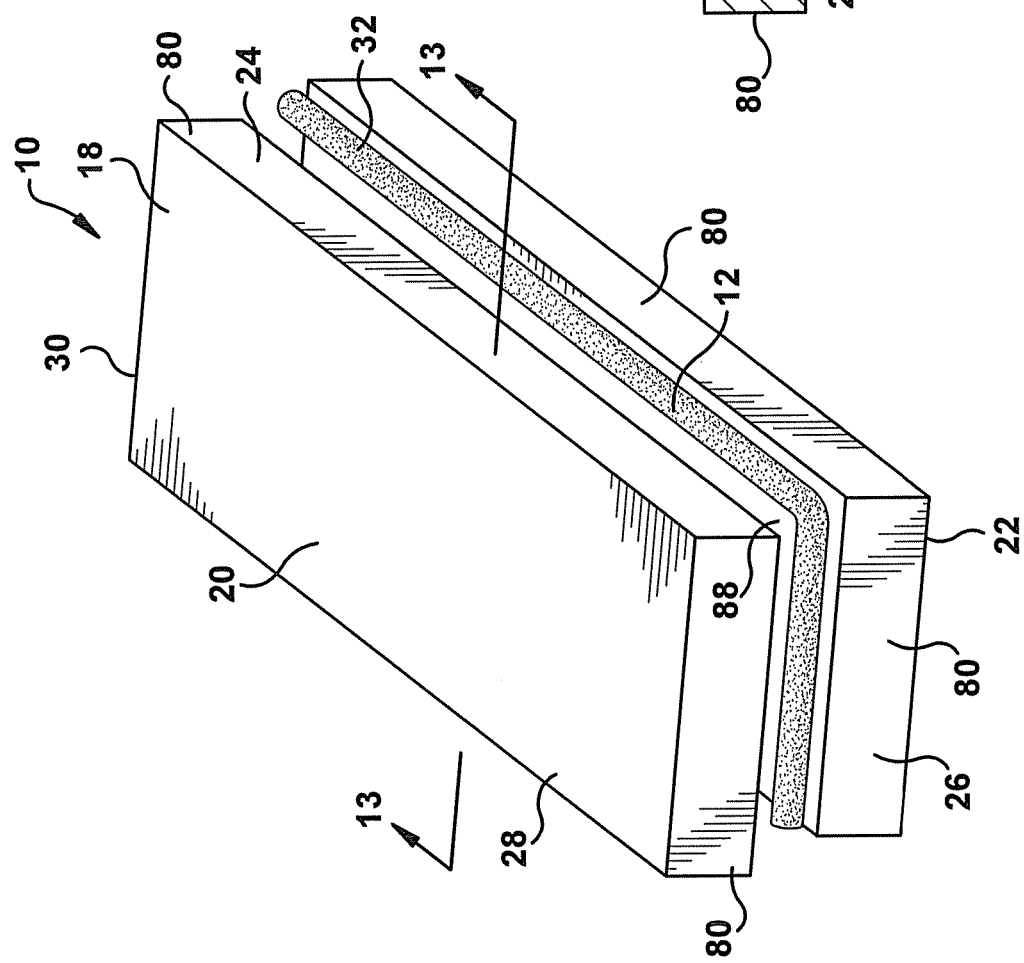
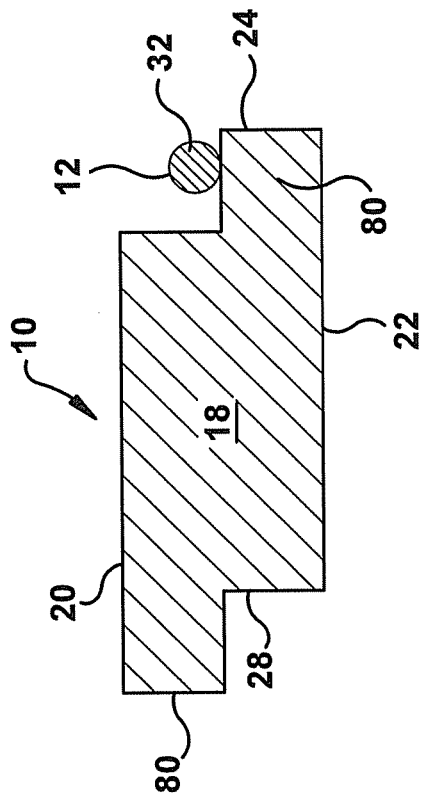
FIG. 12
FIG. 13

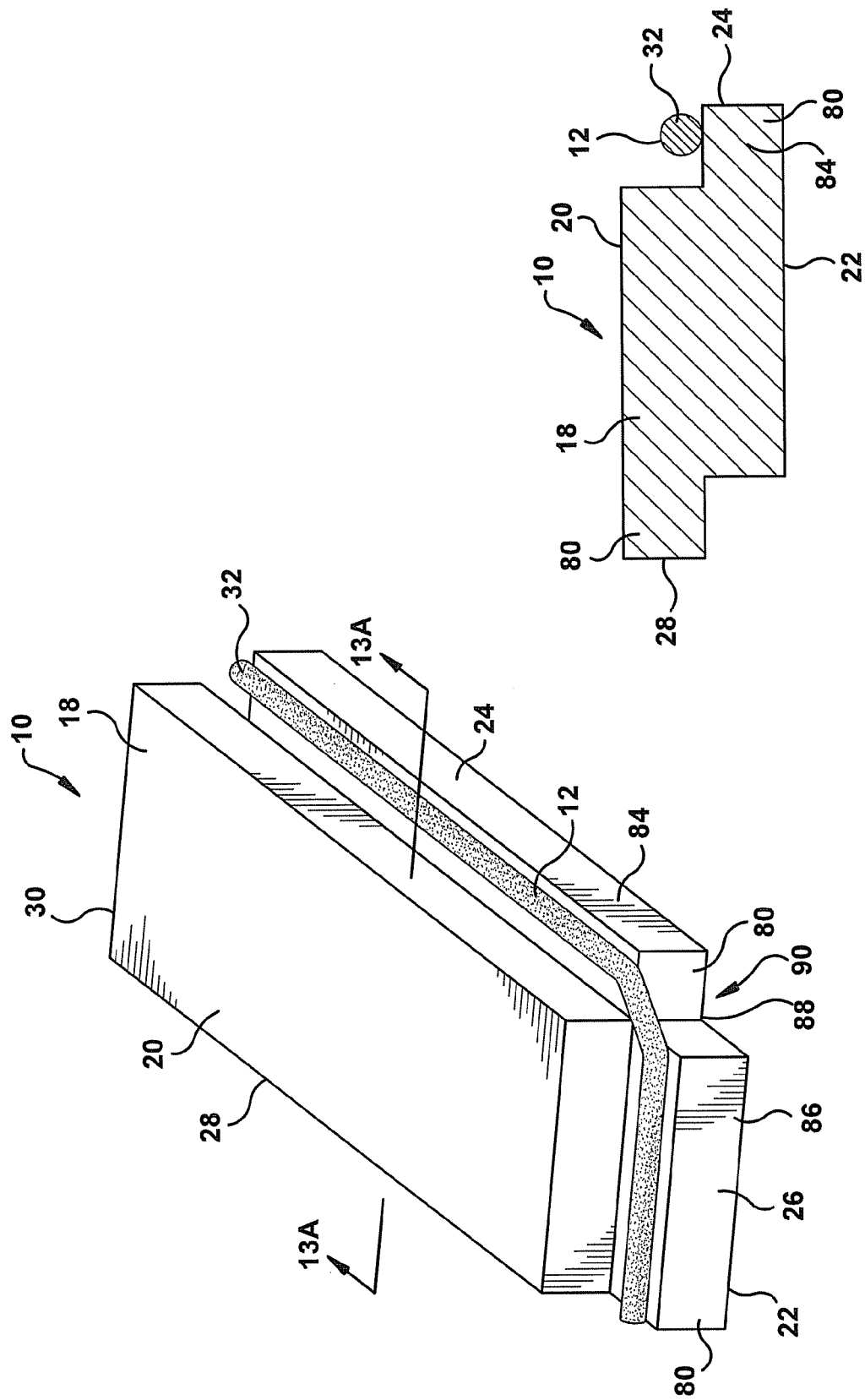

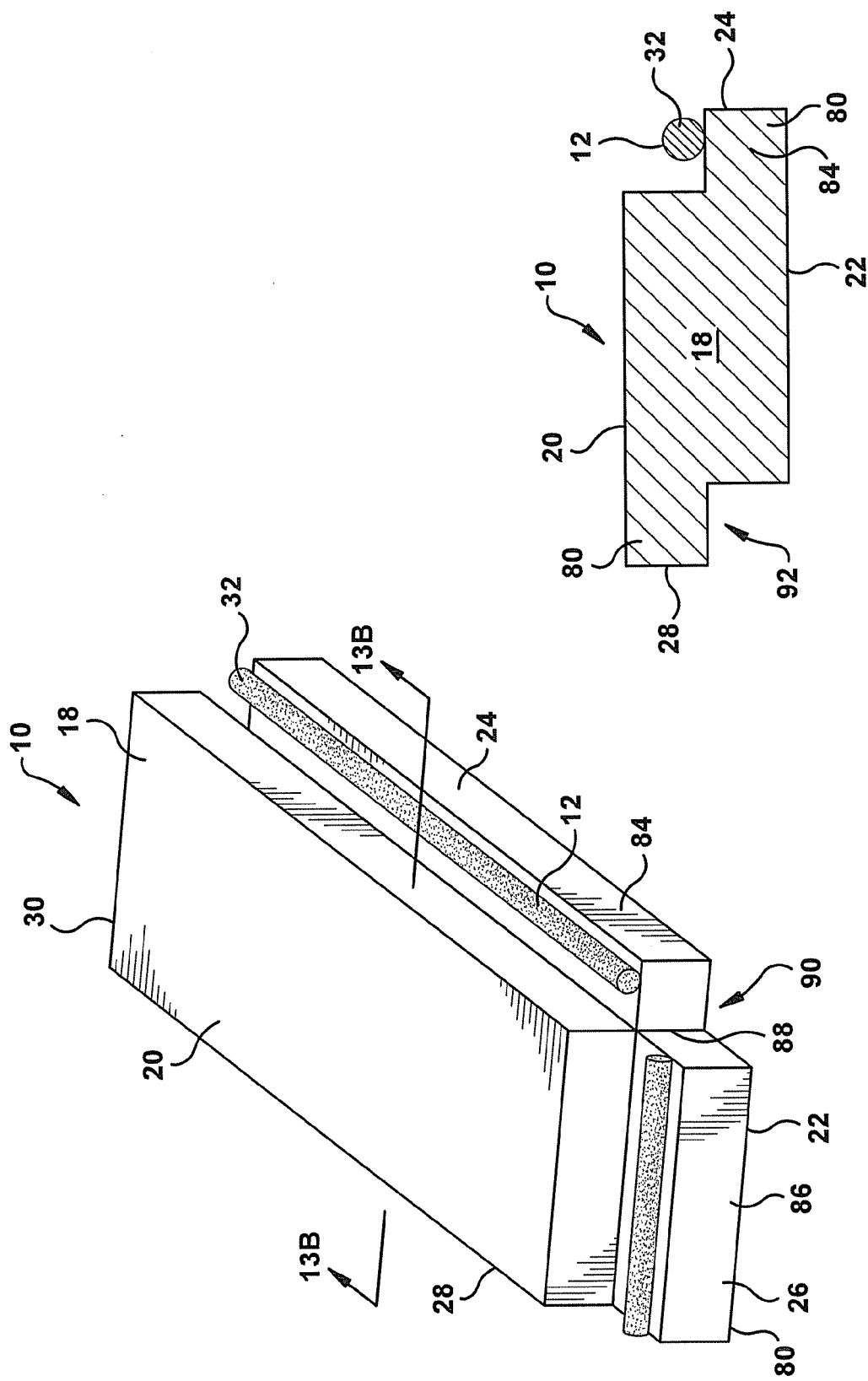

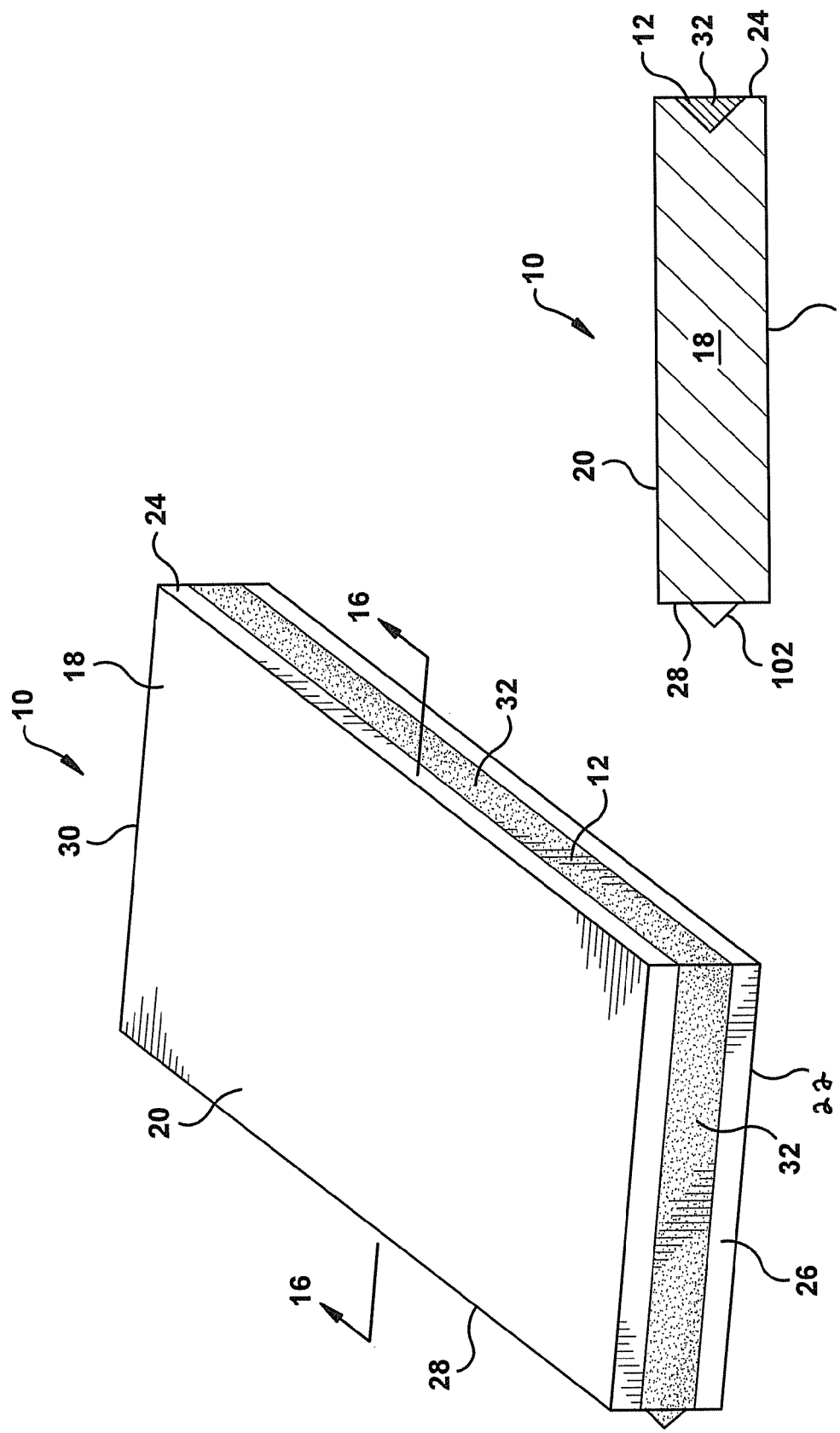

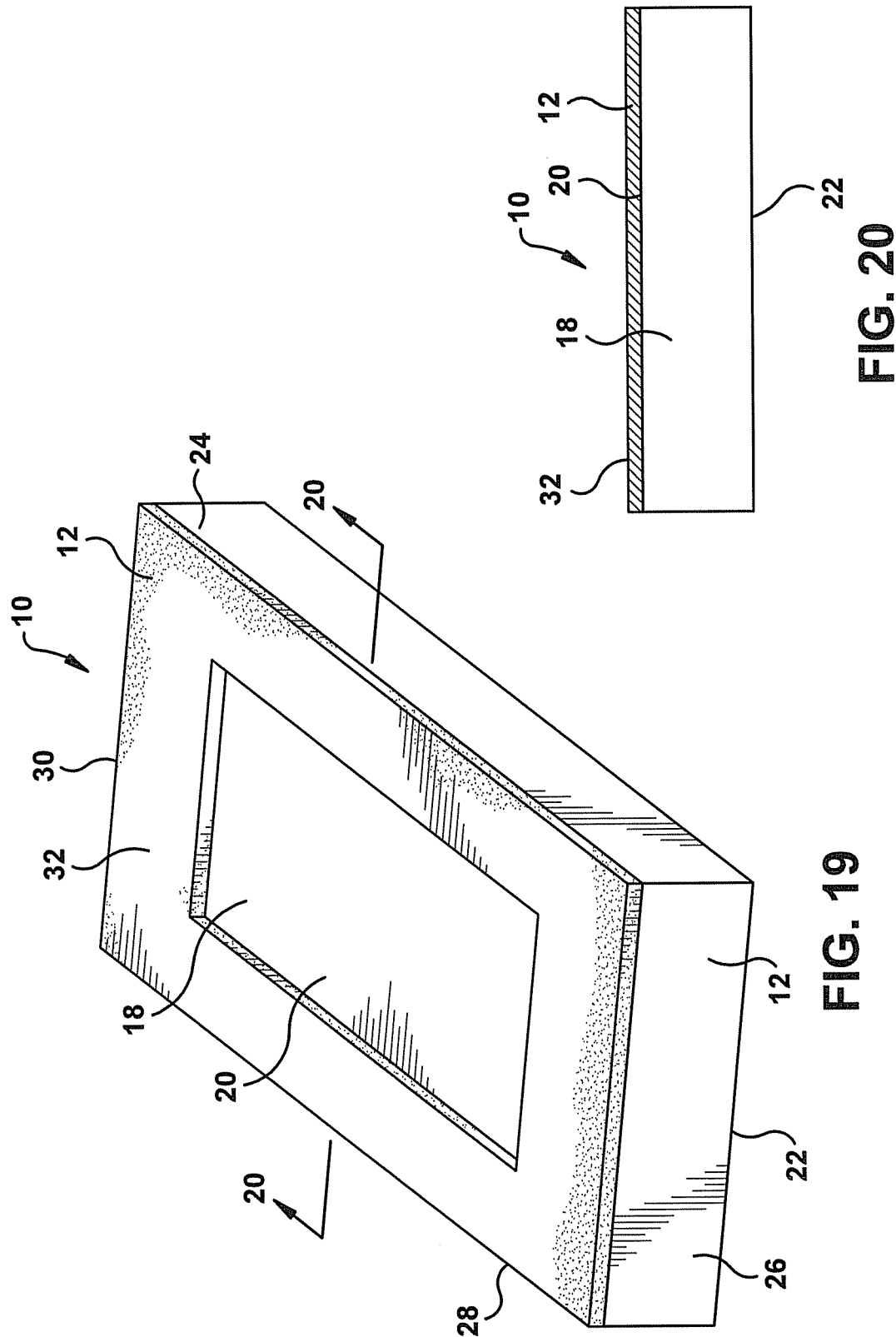

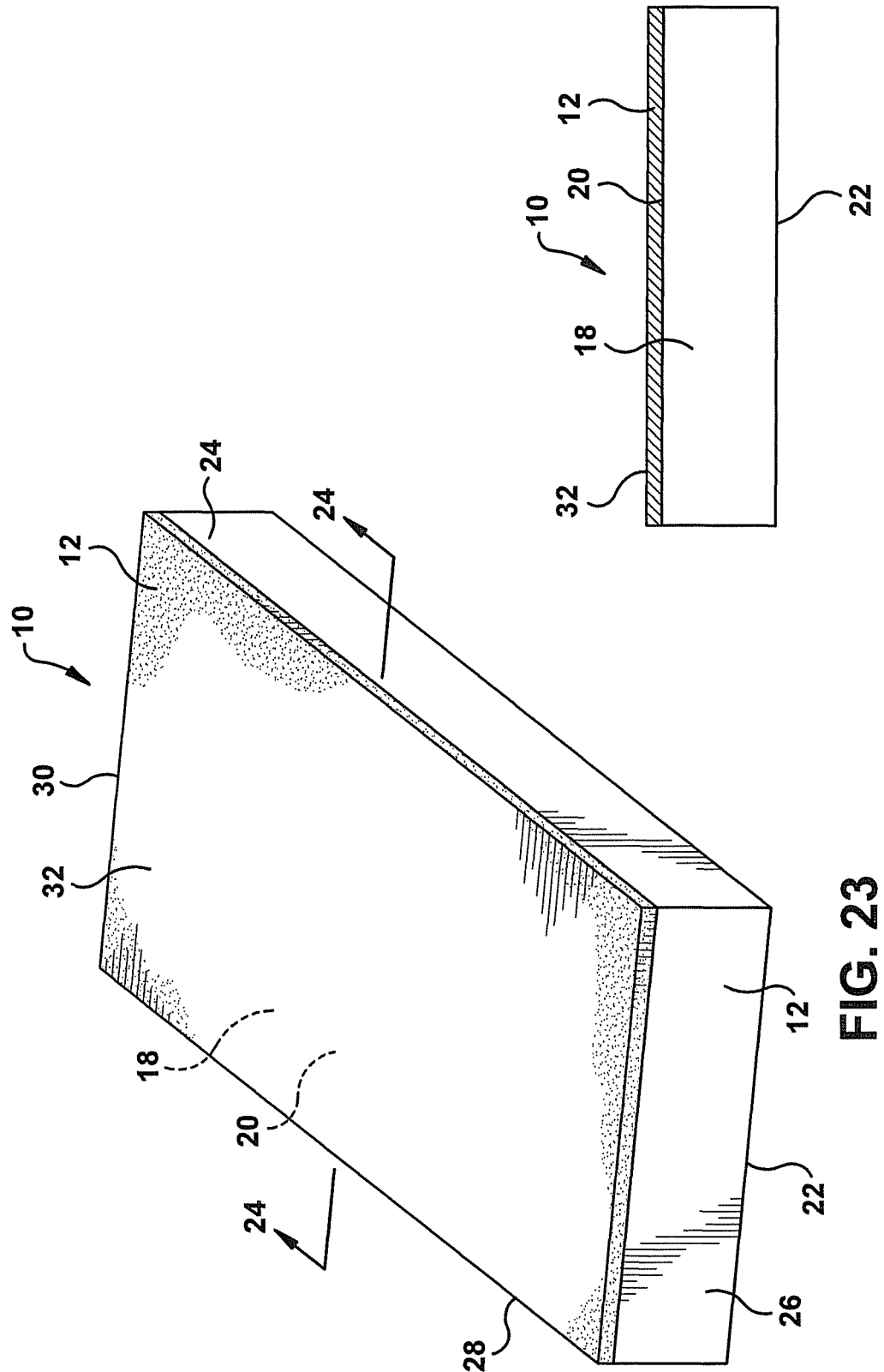

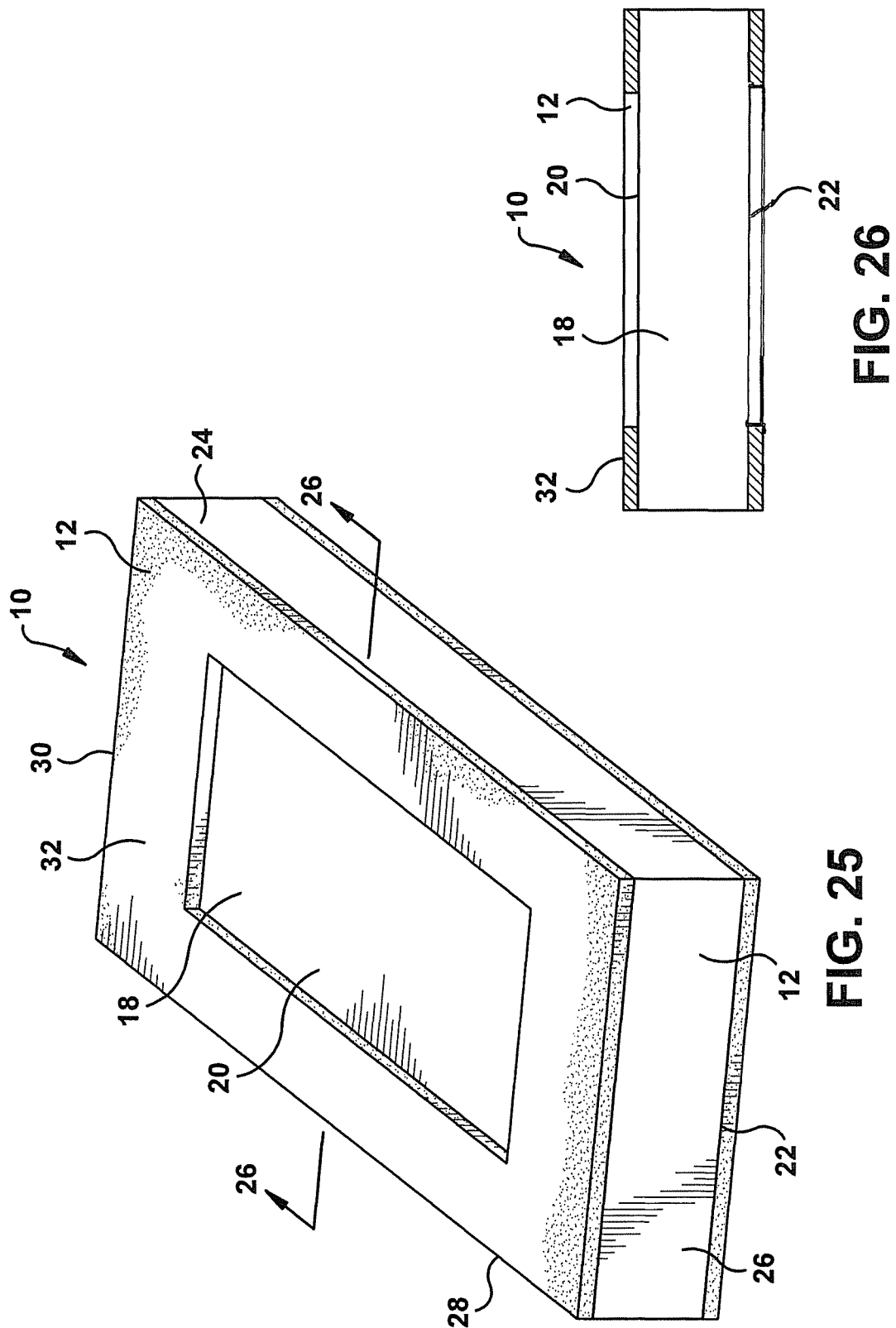

FOAM BOARD WITH PRE-APPLIED SEALING MATERIAL

BACKGROUND OF THE INVENTION

In constructing a building, and in particular a house, a relatively thin panel board is commonly used to cover the structural framework of exterior walls. The board is typically fabricated from a low-cost, lightweight material having enhanced insulating properties, such as for example extruded or expanded polystyrene, polyisocyanurate or polyurethane foam. Usually, the boards are sized for use in conjunction with conventional frame sections (that is, frames with wooden studs on 16 inch (40.64 cm) or 24 inch (60.96 cm) centers). The boards may also have varying thicknesses and compositions, depending on, among other considerations, the desired resistance to heat flow.

In some applications an air and water or moisture barrier is provided between the interior and the exterior of the building. This air and moisture barrier may be achieved using a layer of a plastic sheet known as a water resistive barrier in conjunction with the boards. The air and moisture barrier may also be achieved by taping the joints where the boards abut one another.

SUMMARY

A board with preformed seals is disclosed. In one exemplary embodiment, a sealing material is applied to at least one edge of a board. The board is configured such that when the board is attached to a frame adjacent to a another board, at least a portion of the sealing material applied to the edge of the board seals against another board or other structure. In one exemplary embodiment, the boards are configured to seal against edges of substantially identical boards.

In an exemplary embodiment, a plurality of the boards may be installed on a building frame to form a sheathing system that provides a moisture and/or gas barrier between and interior and exterior of a building. For example, a first board with the pre-applied sealing material may be attached to the frame. A second board with preformed seal may then be attached to the frame at a position where at least a portion of the sealing material of the first board seals against at least a portion of an edge of the second board. This process may be repeated to provide a wall of material that provides an air and/or moisture barrier between an exterior and an interior of the building.

In one exemplary embodiment, a sealing material is applied to at least one face of a board along at least one edge of the board. The board is configured such that when the board is attached to a frame, at least a portion of the sealing material applied along the edge of the board seals against the frame.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 4 is a perspective view of the board illustrated by FIG. 3;

FIG. 5 is a sectional view taken along lines 5-5 in FIG. 4;

FIG. 9 is a perspective view of another embodiment of a board;

FIG. 10 is a sectional view taken along lines 10-10 in FIG. 9;

FIG. 10A is a partial sectional view, similar to FIG. 10, showing an exemplary cross-section of a sealing material channel of a board;

FIG. 10B is a partial sectional view, similar to FIG. 10, showing another exemplary cross-section of a sealing material channel of a board;

FIG. 10C is a partial sectional view, similar to FIG. 10, showing another exemplary cross-section of a sealing material channel of a board;

FIG. 10D is a partial sectional view, similar to FIG. 10, showing another exemplary cross-section of a sealing material channel of a board;

FIG. 10E is a partial sectional view, similar to FIG. 10, showing another exemplary cross-section of a sealing material channel of a board;

FIG. 10F is a partial sectional view, similar to FIG. 10, showing another exemplary cross-section of a sealing material channel of a board;

FIG. 12 is a perspective view of another embodiment of a board;

FIG. 12A is a perspective view of another embodiment of a board;

FIG. 12B is a perspective view of another embodiment of a board;

FIG. 13 is a sectional view taken along lines 13-13 in FIG. 12;

FIG. 13A is a sectional view taken along lines 13A-13A in FIG. 12A;

FIG. 13B is a sectional view taken along lines 13B-13B in FIG. 12B;

FIG. 15 is a perspective view of another embodiment of a board;

FIG. 16 is a sectional view taken along lines 15-15 in FIG. 15;

FIG. 19 is a perspective view of an exemplary embodiment of a board with a sealing material applied to a face of the board along edges of the board;

FIG. 20 is a sectional view taken along the plane indicated by lines 20-20 in FIG. 19;

FIG. 23 is a perspective view of another exemplary embodiment of a board with a sealing material applied to a face of the board;

FIG. 24 is a sectional view taken along the plane indicated by lines 24-24 in FIG. 23;

FIG. 25 is a perspective view of another exemplary embodiment of a board with a sealing material applied to faces of the board along edges of the board;

FIG. 26 is a sectional view taken along the plane indicated by lines 26-26 in FIG. 25;

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

The present application discloses exemplary embodiments of boards 10 with preformed seals 12 (see FIGS. 2-5).

Figure 1:
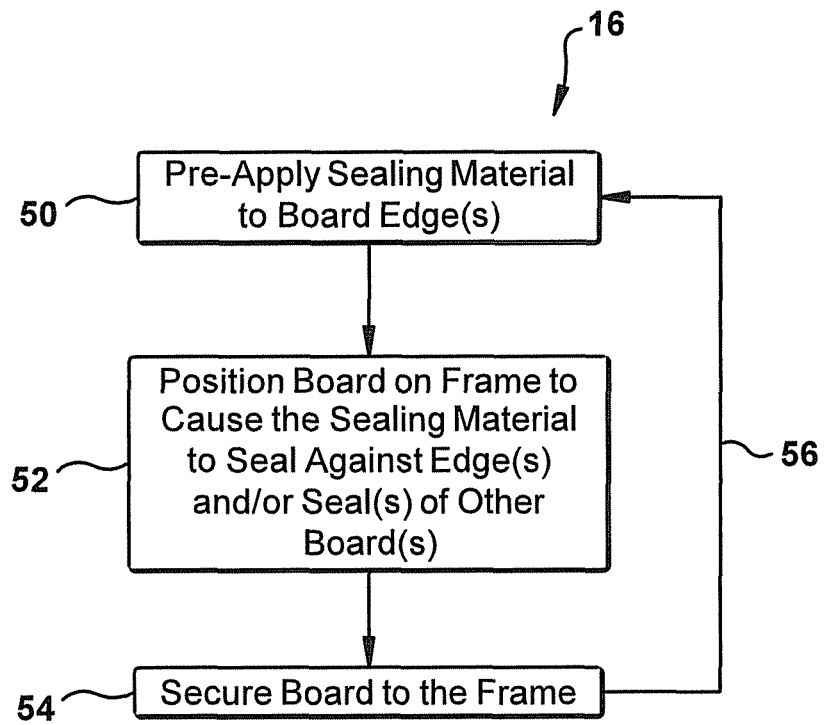
FIG. 1 is a flow chart that illustrates a method of applying a sheathing system to a frame.
Figure 6:
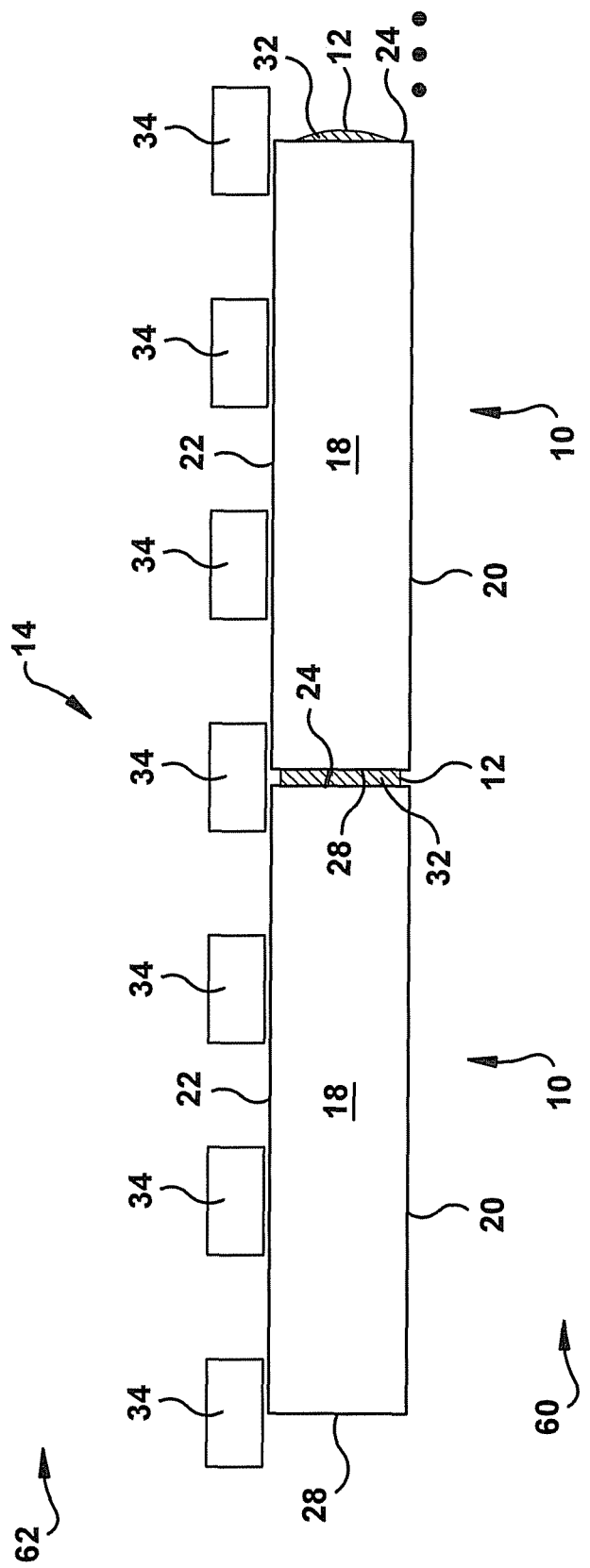
FIG. 6 is a top plan view illustrating assembly of boards with a frame.
Figure 7:
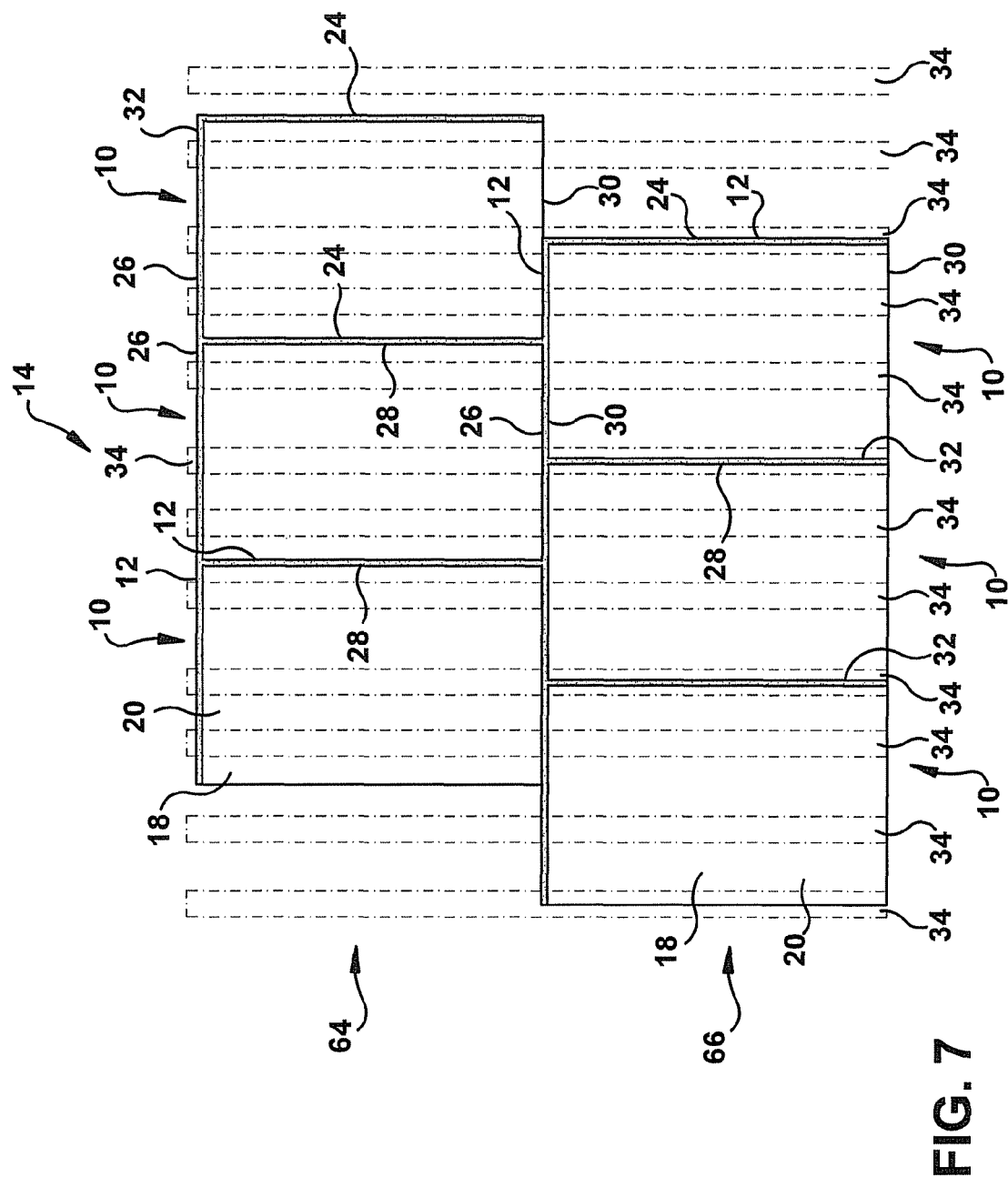
FIG. 7 is a front view illustrating assembly of boards with a frame.
Figure 8:
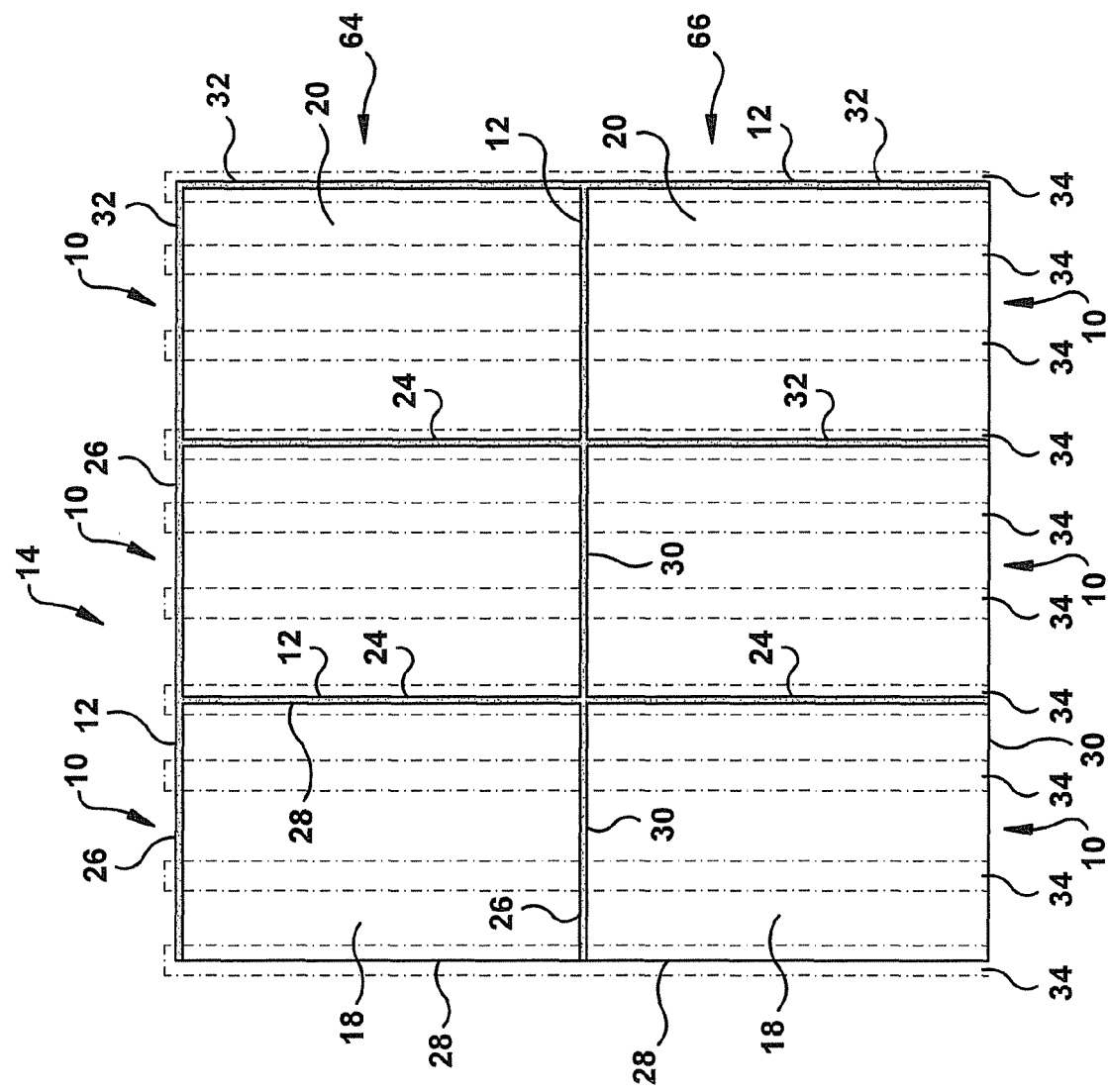
FIG. 8 is a front view illustrating assembly of boards with a frame.

The boards 10 with preformed seals 12 can be used in a wide variety of different applications. In one exemplary embodiment, the boards 10 with preformed seals 12 are used as sheathing boards that are applied to outer studs, joists, rafters and other fame members of a building. For example, FIGS. 6-8 show exemplary embodiments of sheathing systems 14, and FIG. 1 illustrates a method 16 of installing sheathing boards 10 to construct sheathing systems 14. However, the boards 10 with preformed seals 12 can also be used in a wide variety of other applications. For example, the boards 10 with preformed seals 12 may be used as panels on the interior of a building, etc.

In this application, preformed seals 12 are seal members that are formed before the boards 10 are attached to a frame 34, for example to construct a sheathing system. For example, the preformed seals 12 may be formed by pre-applying sealing material 32 to a board at a remote location, such as a factory. The sealing material 32 may dry or otherwise cure to form the preformed seals.

Referring to FIGS. 2-5, one exemplary embodiment of a board 10 with preformed seals 12 includes a board 18 having front and back faces 20, 22 and first, second, third and fourth edges 24, 26, 28, 30. Sealing material 32 is pre-applied to at least one of the edges 24, 26, 28, 30 to form the preformed seals 12 in an exemplary embodiment. In the example illustrated by FIG. 2, the sealing material 32 is applied to first and second edges 24, 26. In the example illustrated by FIG. 3, the sealing material 32 is applied to all four edges 24, 26, 28, 30. In another embodiment, the sealing material 32 may only be applied to one of the edges (see FIG. 4A). For example, when an edge of the board 10 is as tall as the wall being constructed, an air and moisture tight barrier can be constructed with boards 10 having preformed seals 12 only on the edge that is as tall as the wall. In yet another embodiment, the sealing material 32 may be applied to three of the edges. Further, the board 18 may take a wide variety of shapes other than rectangular and the seal material may be applied to any number of the edges of the board 18.

FIGS. 1 and 6-8, illustrate an exemplary embodiment of a method 16 for installing boards 10 with preformed seals to form a sealed sheathing system 14. In an exemplary embodiment, sealing material 32 is pre-applied 50 to edge(s) 24, 26, 28, 30 of the board 18. In an exemplary embodiment, the sealing material 32 is cured to the boards 18 or an adhesive that attach seals 12 to the boards 18 is cured prior to attachment of the board to the frame. Typically this application of the sealing material 32 is done remotely from the site at which the boards 10 with preformed seals are attached to frame members 34 (see FIGS. 6-8) of a building. For example, the application 50 of the sealing material 32 may take place at a factory and the sealing material 32 may be allowed to dry or cure to form the seals 12 prior to being sent to the location where the boards will be installed, for example, as sheathing on the frame 34. In another embodiment, preformed seals 12 may be provided with, but unattached to the boards 18 at the jobsite. The preformed seals 12 are attached to the boards 18 at the jobsite and then are attached to a frame 34 to construct a sheathing system. Using preformed seals 12 reduces the mess and labor associated with applying wet sealing material, such as caulk, on site.

The frame members 34 may take a variety of different forms. For example, the frame 34 may comprise conventional wood or metal framing studs that are typically used to frame houses and other buildings. Any type of material capable of supporting the boards 10 may be used. The boards 10 with preformed seals 12 may be assembled to the frame 34 with conventional fasteners, such as staples, nails, screws, and/or adhesive. Each board 10 with preformed seal(s) 12 is positioned to seal against an edge of one or more other boards and is then fastened to the frame members 34.

The board 10 with preformed seals 12 is positioned 52 (see FIG. 1) on the frame 34 to cause one or more of the preformed seals 12 to seal against another board 10 (see FIGS. 6-8). In an exemplary embodiment, the seal by the sealing material 32 against at least a portion of an edge of a second board or a seal of a second board is an air tight seal. When boards 10 are used that include preformed seals 12 along first and second edges 24, 26 (or along one edge), the seal(s) will engage edge(s) 28, 30 that do not include seals 12 (i.e. the seals directly engage the material of the board 18). Referring to FIG. 6, the sealing material 32 is compressed between the boards 18. When boards 10 include preformed seals 12 along all four edges 24, 26, 28, 30 (or two parallel edges when the parallel edges are as tall as the wall being formed), the seals will engage the seals 12 of other boards 10. That is, the preformed seals 12 engage each other and are compressed.

Once in position, the boards 10 with preformed seals 12 are secured 54 (FIG. 1) to the frame members 34. Securing the boards 10 to the frame members permanently sets the relative positions of the boards 10, which in turn makes the seals 12 between adjacent boards 10 permanent. This process may be repeated 56 (FIG. 1) as many times as necessary to form a system 14 that acts as an air and moisture barrier.

The boards 10 may be arranged in a variety of different patterns to form a system 14 that acts as a barrier against air and/or moisture between the outside 60 (FIG. 6) and inside 62 of a building. In the example illustrated by FIG. 7, boards 10 with preformed seals 12 of top 64 and bottom 66 rows are staggered. Providing preformed seals 12 at the edges 24, 26 of each board 10 allows all of the boards to be sealed together at the edges as indicated by the dark seal lines simply by attaching the boards to the frame in the correct position. If preformed seals are provided around all of the edges 24, 26, 28, 30 (See FIG. 3), all of the boards 10 can be sealed together at the edges regardless of the orientation of the board. Simply placing the boards with the seals in abutment will seal all of the boards together at the edges. In the example illustrated by FIG. 8, boards 10 with preformed seals 12 of top 64 and bottom 66 rows are vertically aligned. Again, providing preformed seals 12 at the edges 24, 26 of each board 10 allows all of the boards to be sealed together at the edges as indicated by the dark seal lines simply by attaching the boards to the frame in the correct position. If preformed seals are provided around all of the edges 24, 26, 28, 30 (See FIG. 3), all of the boards 10 can be sealed together at the edges regardless of the orientation of the board. In embodiments where the board 10 is at least as tall as the wall being constructed, the top row 64 may be omitted. In this embodiment, the boards 10 may include preformed seals on one side, two sides, three sides, or four sides and provide seals between all of the boards 10 at the edges.

The boards 10 with seals 12 may be configured to be used with identical boards with seals and/or the boards 10 with seals 12 may be configured to be used with differently configured boards. In the example illustrated by FIGS. 2, 7 and 8, the boards 10 with seals 12 are configured such that when the board 10 is attached to the frame members 34 adjacent to a substantially identical board 10 at least a portion of the preformed seal(s) 12 applied to an edge 24, 26 of the board 10 seals against at least a portion of an edge 28, 30 of the substantially identical board. Similarly, in the example illustrated by FIG. 3, preformed seals 12 are configured such that when the board 10 is attached to the frame members 34 adjacent to a substantially identical board 10 at least a portion of its preformed seal(s) seals against at least a portion of preformed seal(s) 12 of other substantially identical board(s).

Figure 3:
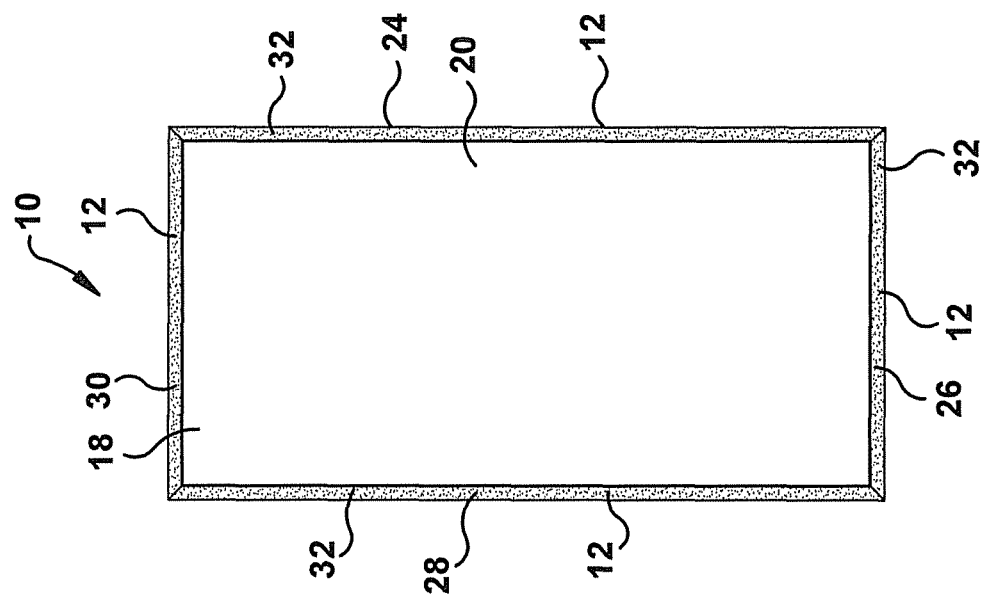
FIG. 3 is a front elevational view of another exemplary embodiment of a board.
Figure 2:
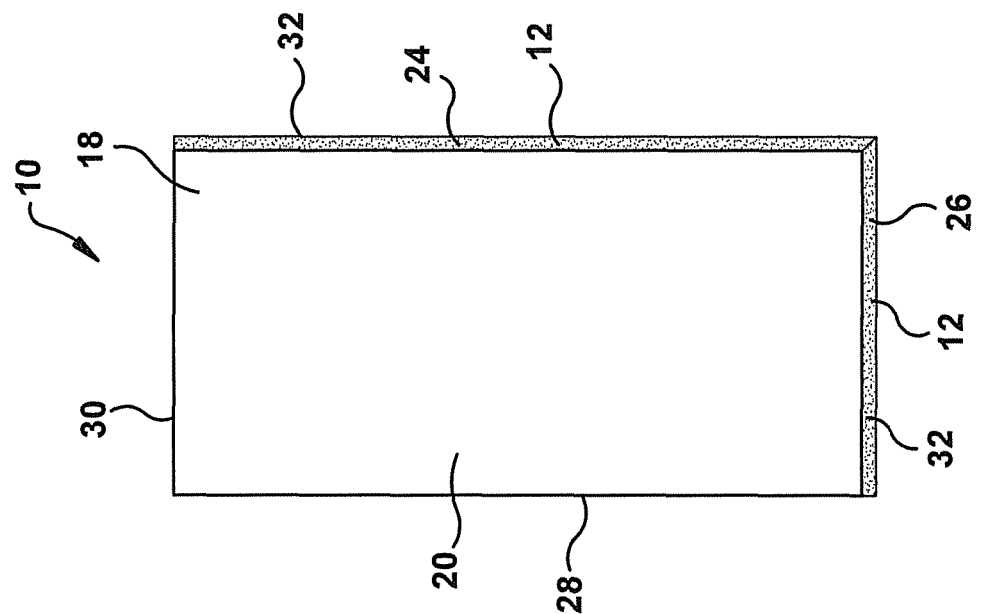
FIG. 2 is a front elevational view of an exemplary embodiment of a board.
Figure 4A:
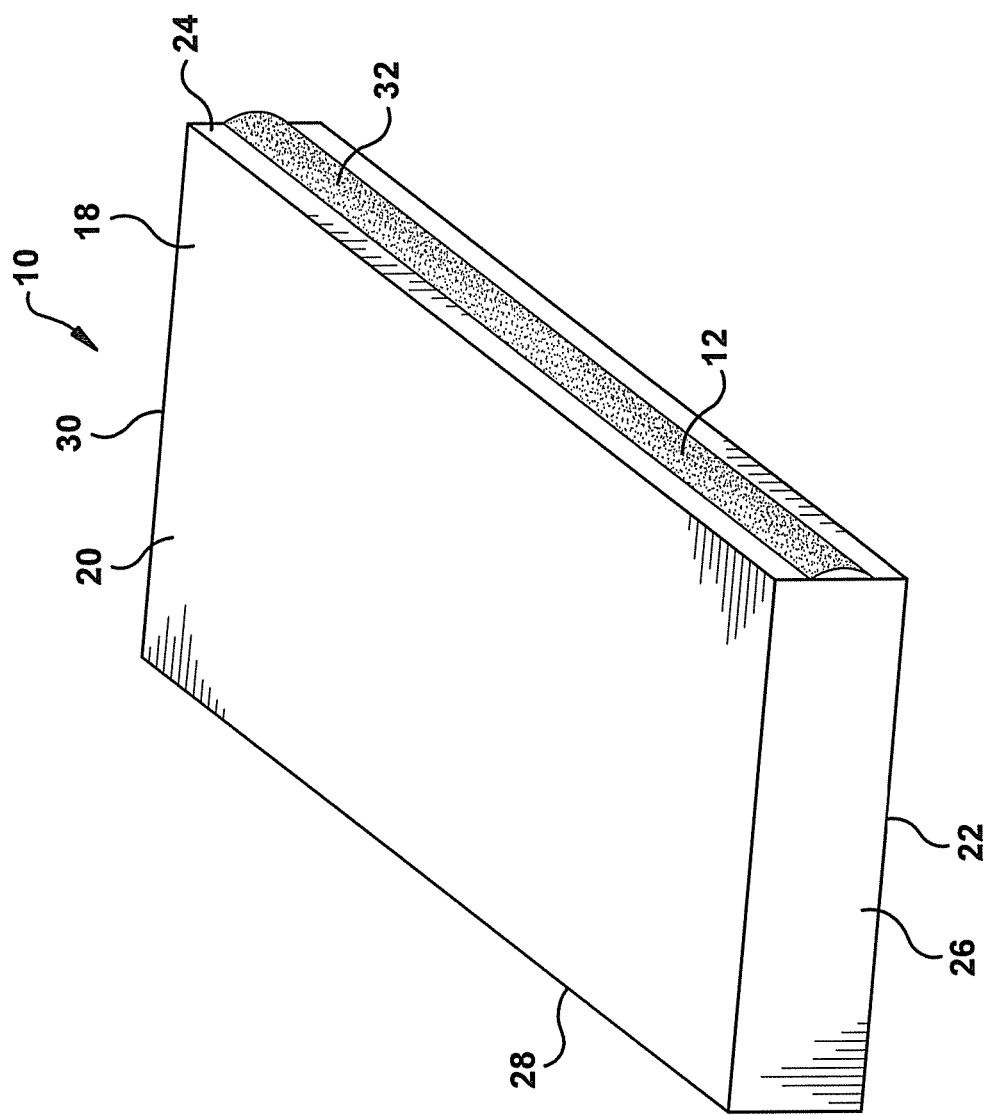
FIG. 4A is a perspective view of a board similar to the board shown in FIG. 4 with a sealing material pre-applied to only one edge.
Figure 5A:
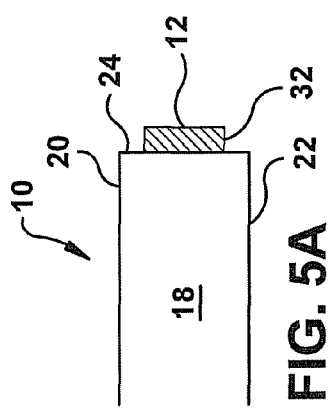
FIG. 5A is a partial sectional view, similar to the view of FIG. 5, showing an exemplary cross-section of a sealing material.
Figure 5B:
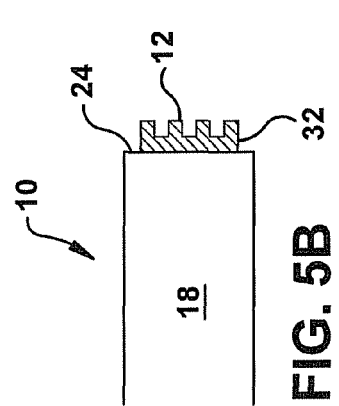
FIG. 5B is a partial sectional view, similar to the view of FIG. 5, showing another exemplary cross-section of a sealing material.
Figure 5C:
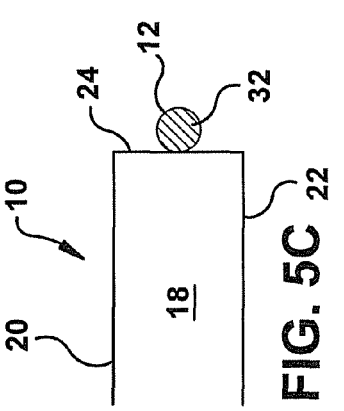
FIG. 5C is a partial sectional view, similar to the view of FIG. 5, showing another exemplary cross-section of a sealing material.
Figure 5D:
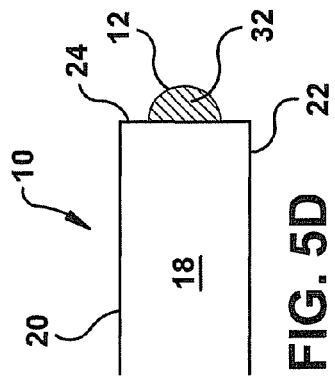
FIG. 5D is a partial sectional view, similar to the view of FIG. 5, showing another exemplary cross-section of a sealing material.
Figure 5E:
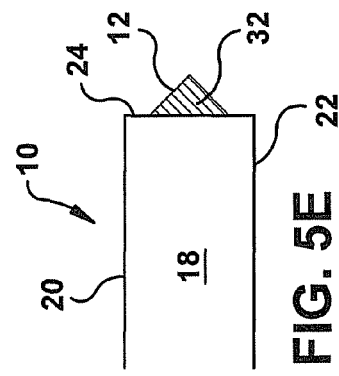
FIG. 5E is a partial sectional view, similar to the view of FIG. 5, showing another exemplary cross-section of a sealing material.
Figure 5F:
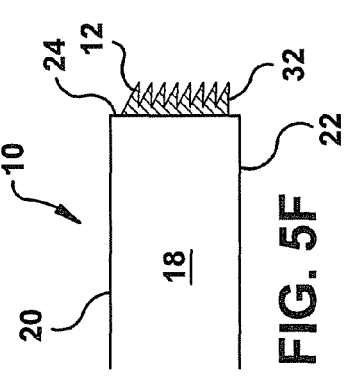
FIG. 5F is a partial sectional view, similar to the view of FIG. 5, showing another exemplary cross-section of a sealing material.
Figure 8A:
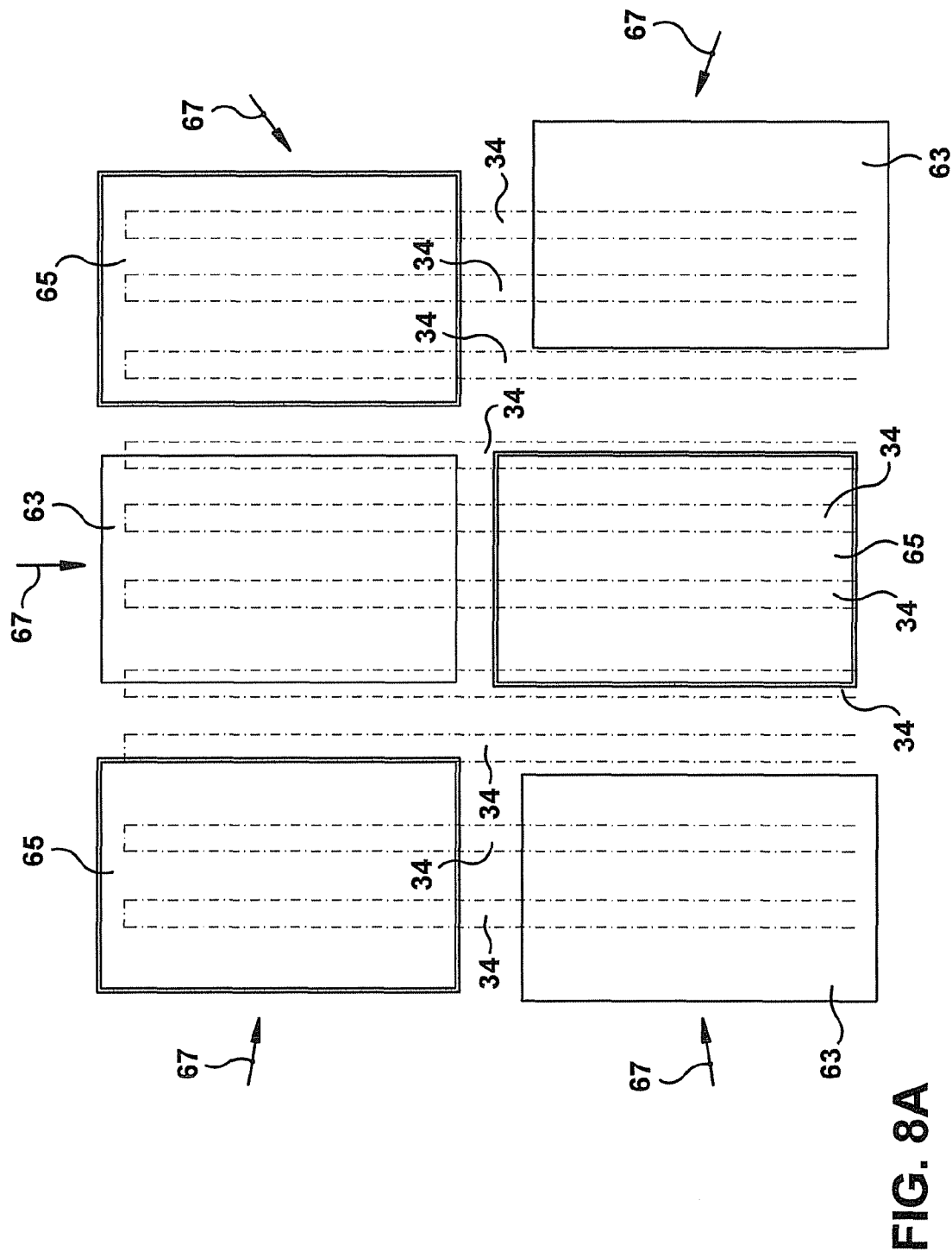
FIG. 8A is a front view illustrating assembly of boards with a frame.

In the FIG. 3 embodiment, since preformed seals 14 are provided on all four sides, an alternating pattern of boards 10 with the preformed seals and boards that have no seals may be employed to construct an air and moisture barrier. For example, in the system 14 illustrated by FIG. 8A, the three boards 63 can be boards with no seals and the three boards 65 can be boards 10 with preformed seals on all four sides 24, 26, 28, 30. The boards 10 with seals 12 and the boards 18 without seals are shown spaced apart in FIG. 8A to clearly show the seal/no seal configuration. The boards will be positioned as indicated by arrows 67 before being fastened to the frame 34. Using some boards with no preformed seals in the system 14 can reduce the cost of the system, since the boards with no preformed seals may be less expensive than boards that include the preformed seals.

The boards 18 can be made from a wide variety of different materials and combinations of materials. Examples include, but are not limited to, oriented strand board (OSB), plywood, foam materials, such as, polystyrene, extruded polystyrene, expanded polystyrene, molded polystyrene, polyisocyanurate, polyurethane, any open or closed cell foam material, reinforced foam materials, such as polystyrene, extruded polystyrene, expanded polystyrene, molded polystyrene, polyisocyanurate, polyurethane with a reinforcement skin laminated on one or both sides, and composite materials, such a as composites of any one or more of OSB, plywood, any of the foam materials listed above, fiberglass reinforced sheets, the sheathing material or any component or combination of the components of the sheathing material that is described in US Pat. No. 6,715,249 to Rusek et al. (which is incorporated herein by reference in its entirety). The boards may comprise any product capable of being provided in a rigid or semi-rigid sheet or board form.

The boards 18 may take a variety of different configurations. The boards 18 may have a variety of different thicknesses. For example, the boards 18 may be foam boards that are ½", ¾", 1" or up to 4" thick. In some embodiments, the boards are thin. For example, in the embodiments illustrated by FIGS. 19-28 the boards may be less than ⅛" thick or less than 1/10" thick, such as 0.031", 0.062", 0.078", or 0.093" thick. Thin boards may also be used in the embodiments illustrated by FIGS. 2-17. Thin boards may take a wide variety of different forms. For example, thin sheathing materials such as ThermoPly material from Ludlow Coated Products and Thermosheath from National Shelter Products, Inc. In addition, thin boards may be made from any of the board materials listed above or any combination of the materials listed above.

The boards 18 may have a variety of different shapes. For example, the boards 18 may be polygonal, such as triangular, square, rectangular, hexagonal, etc. Edges that include the seal material 32 may take a wide variety of different forms. The edges that include the seal material 32 may include projections and/or channels. Edges that do not include seal material may also take a wide variety of different forms. The edges that do not include the seal material 32 may include projections and/or channels. The edges of the board 18 that will receive seal material 32 may be the same or different than the edges of the board that will not receive seal material 32.

The sealing material 32 may take a wide variety of different fowls. Examples of suitable sealing materials 32 include, but are not limited to, spray foam materials, such as Energy Complete available from Owens Corning, polystyrene, extruded polystyrene, expanded polystyrene, polyisocyanurate, polyurethane, and any compressible sealing foam that stays flexible when cured. The sealing material 32 can be open or closed cell and can be applied such that when two boards 10 are abutted or joined in the case of a ship lap or lip edge (see FIG. 14), the preformed seal 12 is compressed, making for a seal against air and/or moisture intrusion. The sealing material 32 may be any material, that when cured is capable of forming a seal with the material of the board 18 and/or another preformed seal.

Figure 18A:
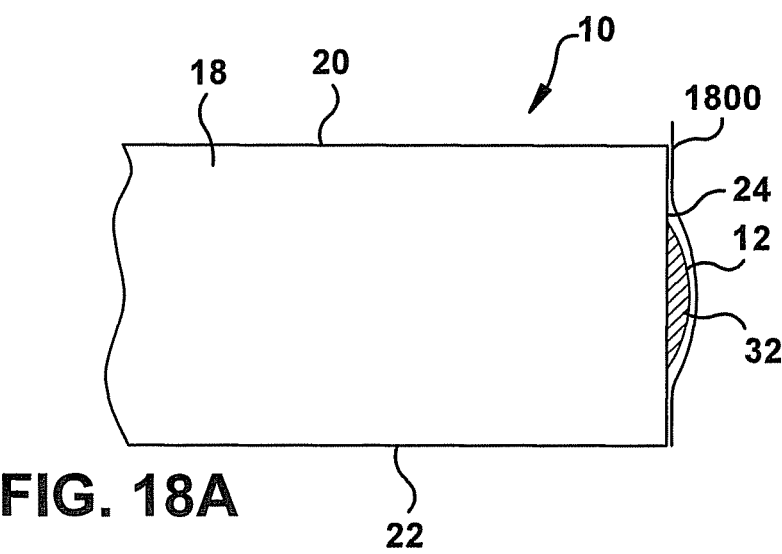
FIG. 18A is a partial sectional view showing cross-sections of an exemplary embodiment of a board with a preformed seal and a protective layer.
Figure 18B:
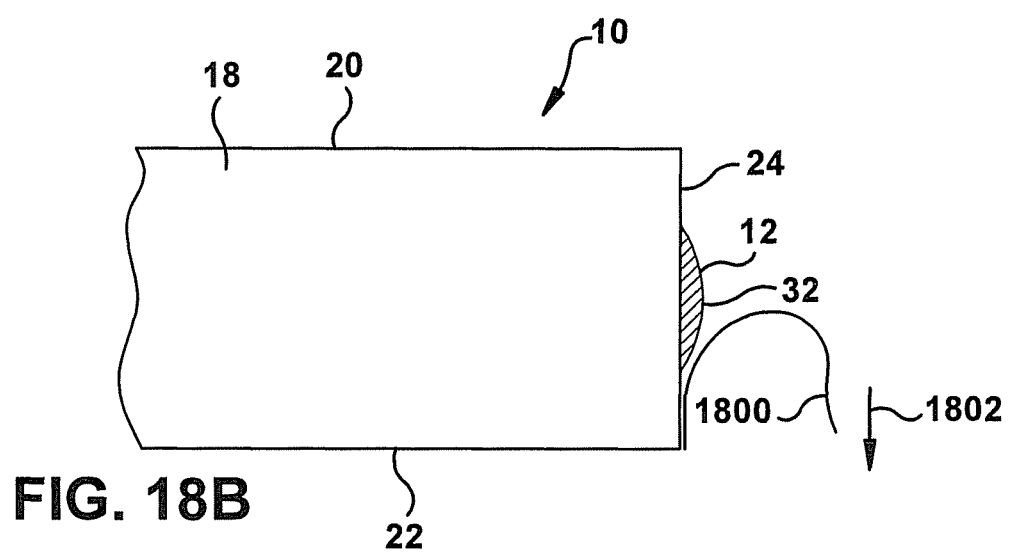
FIG. 18B is a view similar to FIG. 18A illustrating the protective layer being pulled off of the preformed seal.
Figure 18C:
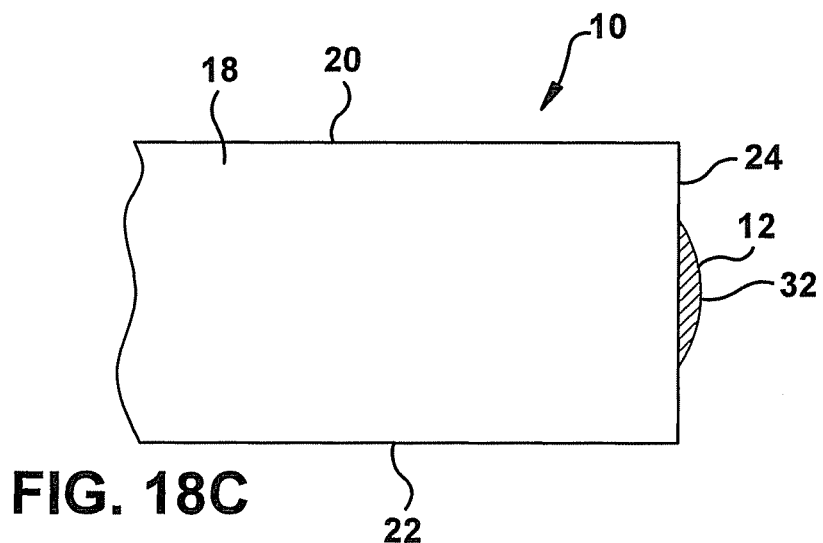
FIG. 18C is a view similar to FIG. 18B illustrating the preformed seal with the protective layer removed.
Figures 21, 22:
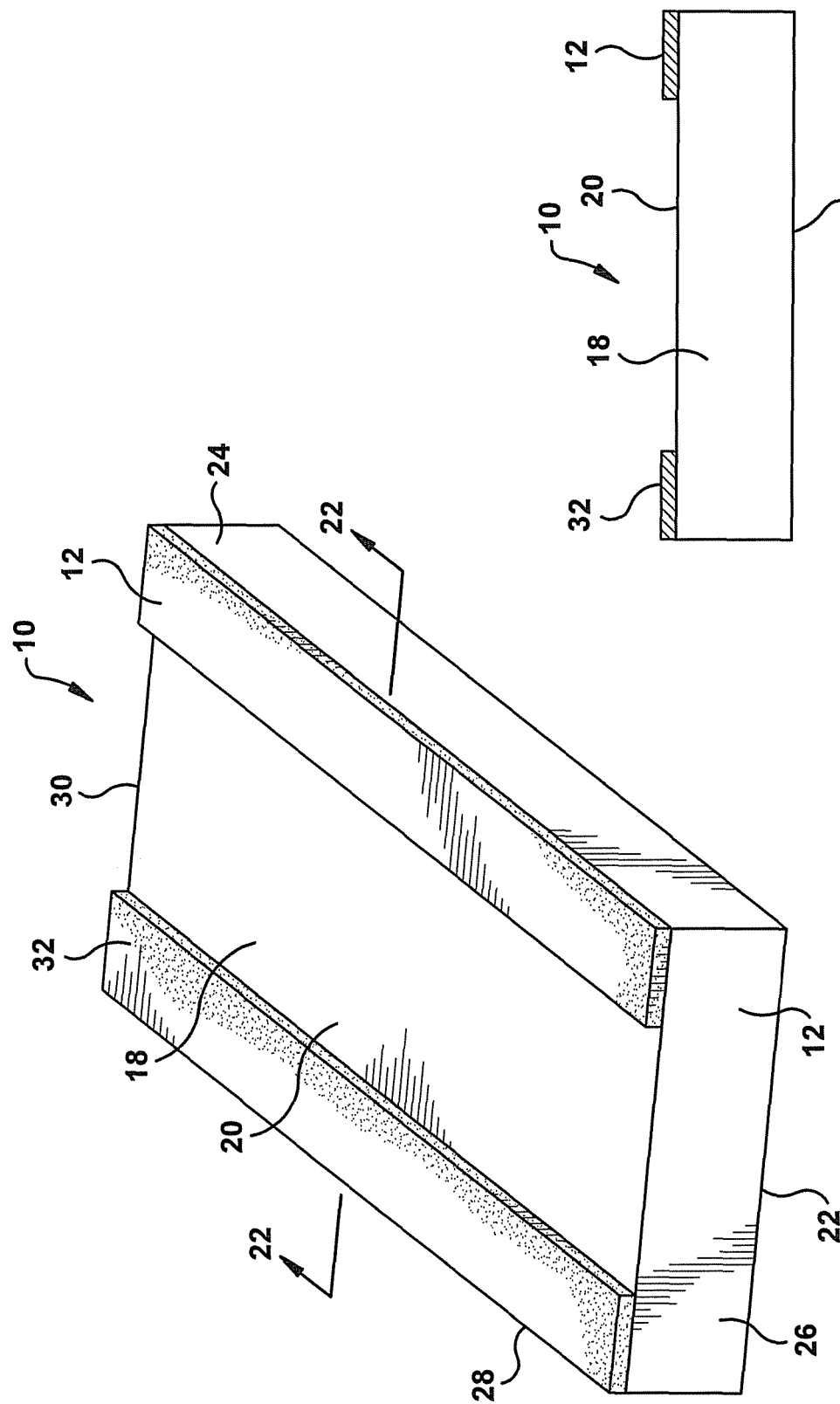
FIG. 21 is a perspective view of another exemplary embodiment of a board with a sealing material applied to a face of the board along edges of the board.
FIG. 22 is a sectional view taken along the plane indicated by lines 22-22 in FIG. 21.

Referring to FIGS. 18A-18C, in one exemplary embodiment an optional protective cover 1800 may be provided over the preformed seal member 12. The protective cover may take a wide variety of different forms. In the illustrated embodiment, the protective layer 1800 is a film or tape. In FIG. 18A, the film is disposed over the preformed seal, protecting it from dirt and/or abrasion. Referring to FIG. 18B, to use the board 10 with preformed seal 12, the protective layer is pulled off as indicated by arrow 1802. Referring to FIG. 18C, once the layer is removed, the board 10 with preformed seal(s) can be used as described herein.

The preformed seal 12 may have a wide variety of different configurations. Any shape and size of seal 12 that facilitates sealing between the seal 12 and an edge of an adjacent board 10 and/or between the seal 12 and a seal of an adjacent board may be used. The preformed seal 12 may be formed by spray application to the board 18, extrusion onto the board, molding onto or with the board, preforming a gasket that is attached to the board with an adhesive, etc. In the example illustrated by FIGS. 4 and 5, the seal has a rounded shape in cross-section. In the example illustrated by FIG. 5A, the seal has a rectangular shape in cross-section. In the example illustrated by FIG. 5B, the seal has a rectangular shape with rectangular teeth in cross-section. In the example illustrated by FIG. 5C, the seal has a circular shape in cross-section. In the example illustrated by FIG. 5D, the seal has a rounded shape in cross-section. In the example illustrated by FIG. 5E, the seal has a triangular shape in cross-section. In the example illustrated by FIG. 5F, the seal has a plurality of triangular teeth in cross-section. These are but a few examples of the many possible shapes of the preformed seal.

The preformed seal 12 may be secured to the edge(s) of the board 18 in a wide variety of different ways. In the example illustrated by FIGS. 4 and 5, edges 24, 26, 28, 30 are squared off. The seal material 32 is simply provided directly on the squared off edge(s).

Figure 11:
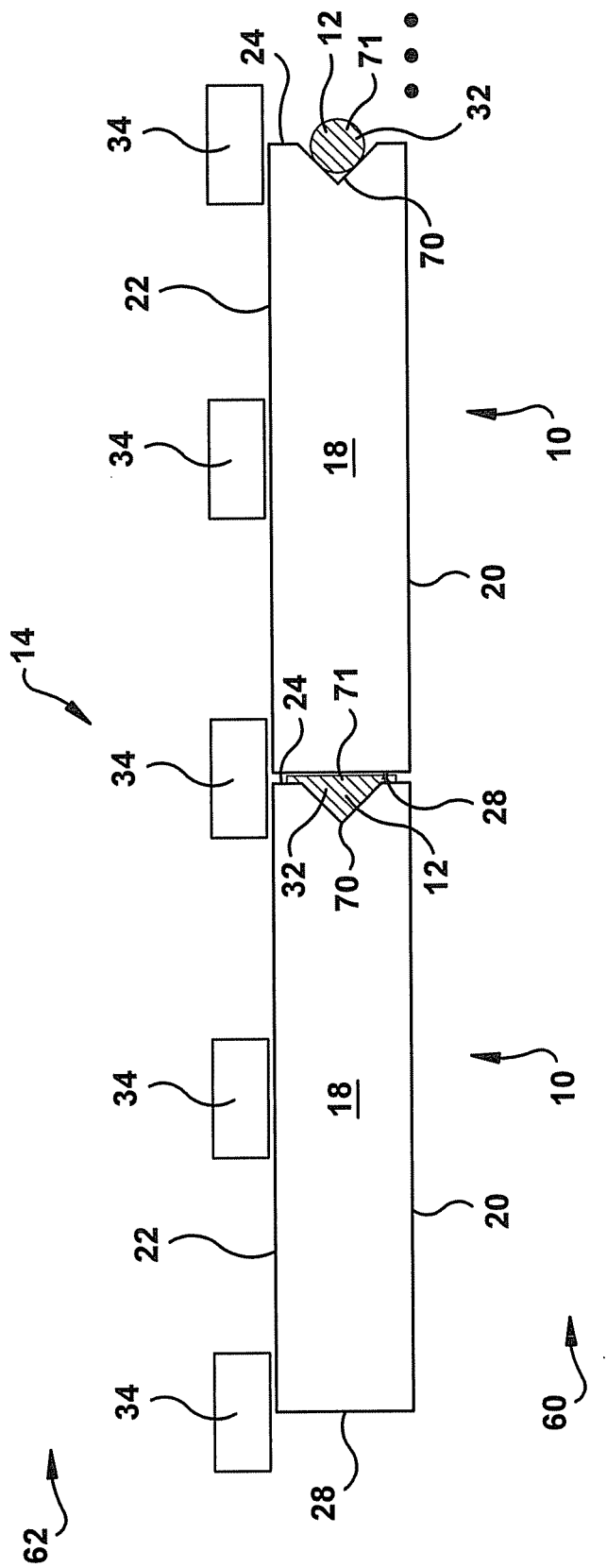
FIG. 11 is a top plan view illustrating assembly of boards with a frame.

In the example illustrated by FIGS. 9 and 10, one or more of the edges 24, 26, 28, 30 include a channel 70. The seal material 32 is applied in the channel(s). In an exemplary embodiment, the seal material 32 is applied in the channel 70 such that a portion 71 of it extends beyond the edge of the board 18. The channel(s) 70 help to secure the preformed seal to the board 18 and may provide some space for the seal material when the seal 12 is compressed (see FIG. 11). The channel 70 may have a variety of different shapes and sizes. In the example illustrated by FIGS. 10 and 10A, the channel 70 is triangular in cross-section. In the example illustrated by FIG. 10B, the channel 70 is rectangular in cross-section. In the example illustrated by FIG. 10C, the channel 70 is semi-circular in cross-section. In the example illustrated by FIG. 10D, the channel 70 is rectangular with laterally extending recesses 72 in cross-section. The recesses 72 help to secure the seal 12 in the channel 72 and/or provide additional space for the seal material 32 when the seal 12 is compressed. In the example illustrated by FIG. 10E, the channel 70 includes a tapered portion 73, a neck portion 74, and laterally extending recesses 75 in cross-section. The tapered portion 73, a neck portion 74, and laterally extending recesses 75 help to secure the seal 12 in the channel 72 and/or provide additional space for the seal material 32 when the seal 12 is compressed. Referring to FIG. 11, the board 10 with channel(s) 70 is secured to the frame members 34 to compress one or more of the preformed seals 12 and seal against another board 10.

In the examples illustrated by FIGS. 12A-12C and 13A-13C, one or more of the edges 24, 26, 28, 30 includes a lip 80. The lip 80 can take a variety of different forms. In the example illustrated by FIG. 12, the board 18 has a ship lap configuration. This configuration can be constructed by using a router or other machining tool to remove material to form a continuous lip along two adjacent edges 24, 26 and then flipping the board over and removing material to form a continuous lip along the other two adjacent edges 28, 30. In the examples illustrated by FIGS. 12A and 12B, the lip 80 includes discrete lip portions 84, 86 along the edges 24, 26. The lip portions 84, 86 are not joined at the corner 88, forming a notch 90. Recesses 92 are formed along edges 28, 30 and are sized to accept the lip portions 84, 86.

Figure 14:
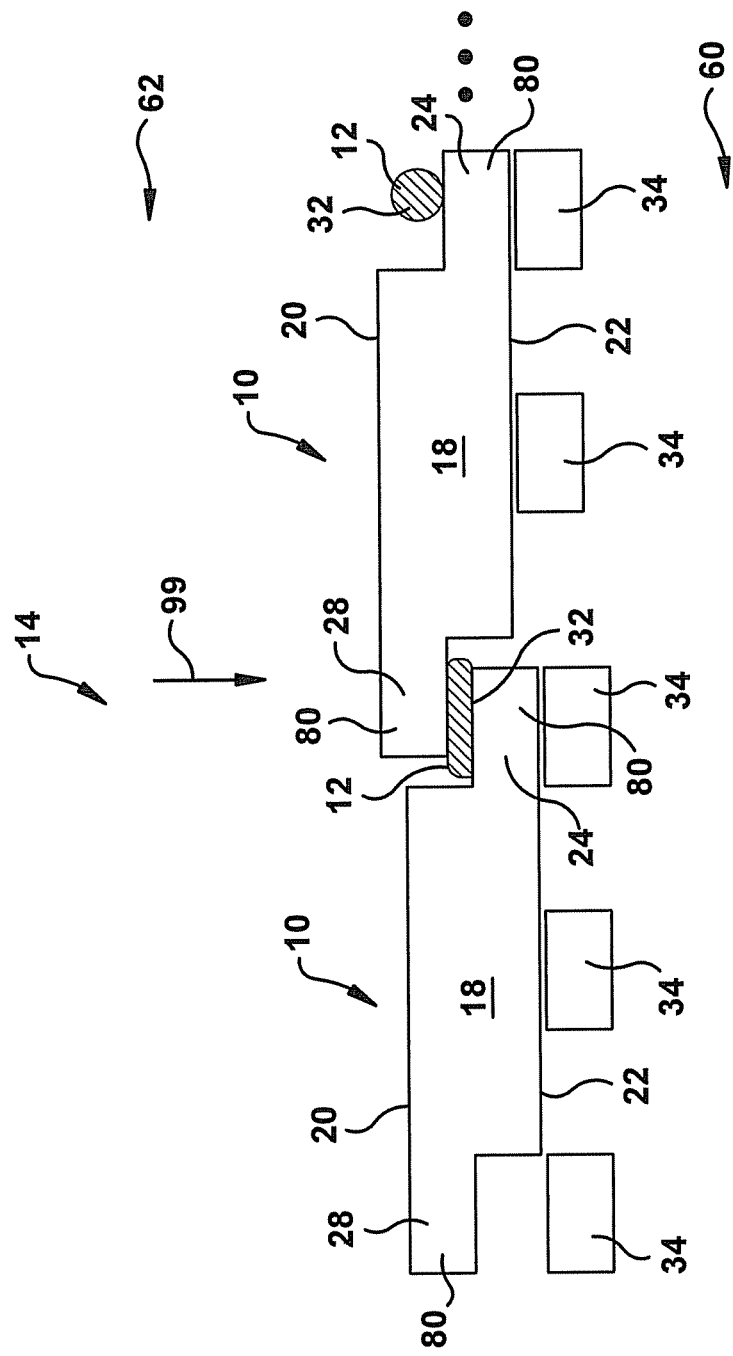
FIG. 14 is a top plan view illustrating assembly of boards with a frame.

The seal material 32 is applied on the lips 80. The seal material may be applied in a variety of different ways. In the embodiments illustrated by FIGS. 12 and 12A, the seal material is applied around the corner 88. In the embodiment illustrated by FIG. 12B, the seal material 32 is applied to ends 94, 96 of the lip portions 84, 86, but not around the corner 88. Referring to FIG. 14, the board 10 with lip(s) 80 are secured to the frame members 34 to compress (indicated by arrow 99) one or more of the preformed seals 12 between the lips and seal against another board 10. This may be repeated as described above to form an air and/or moisture tight barrier between an exterior and an interior of the building.

Figure 16A:
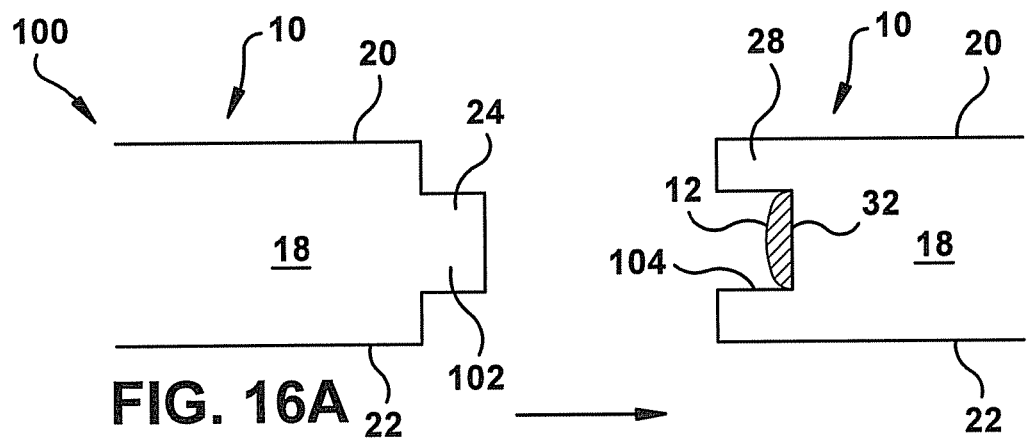
FIG. 16A is a partial sectional view showing cross-sections of an exemplary embodiment of mating boards.
Figure 16B:
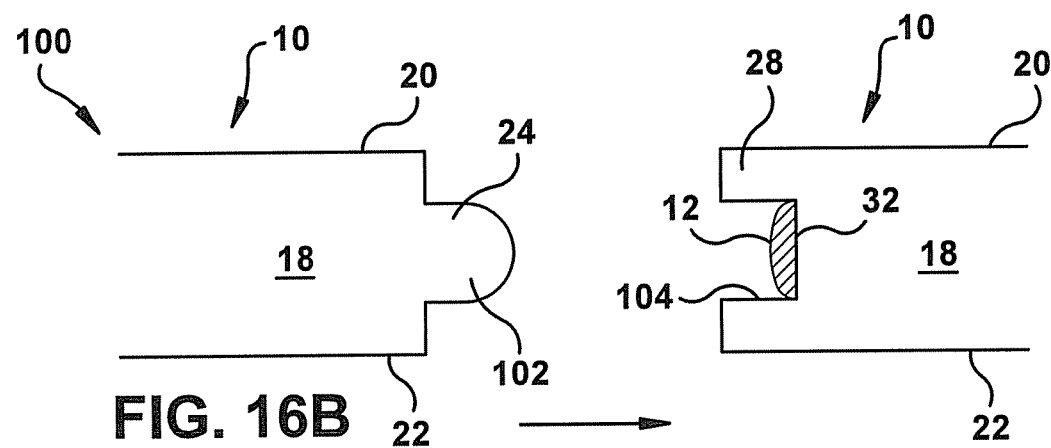
FIG. 16B is a partial sectional view showing cross-sections of another exemplary embodiment of mating boards.
Figure 16C:
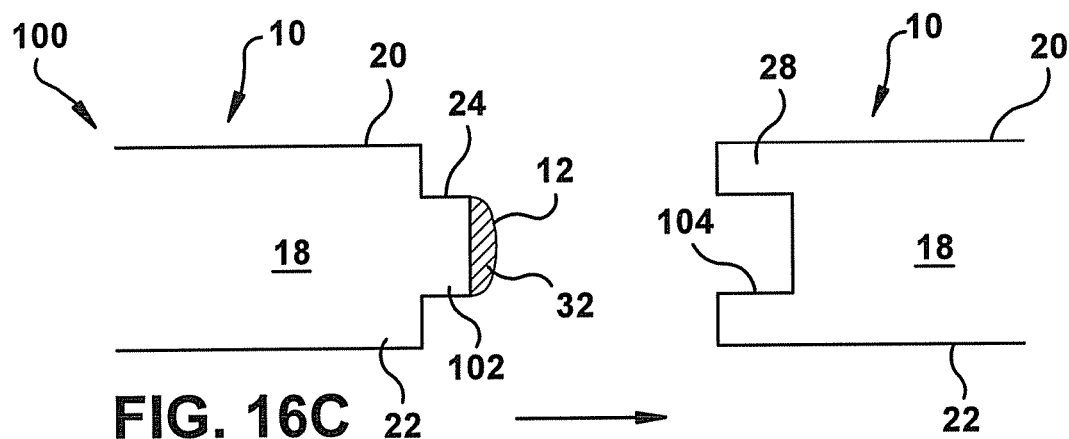
FIG. 16C is a partial sectional view showing cross-sections of another exemplary embodiment of mating boards.
Figure 17:
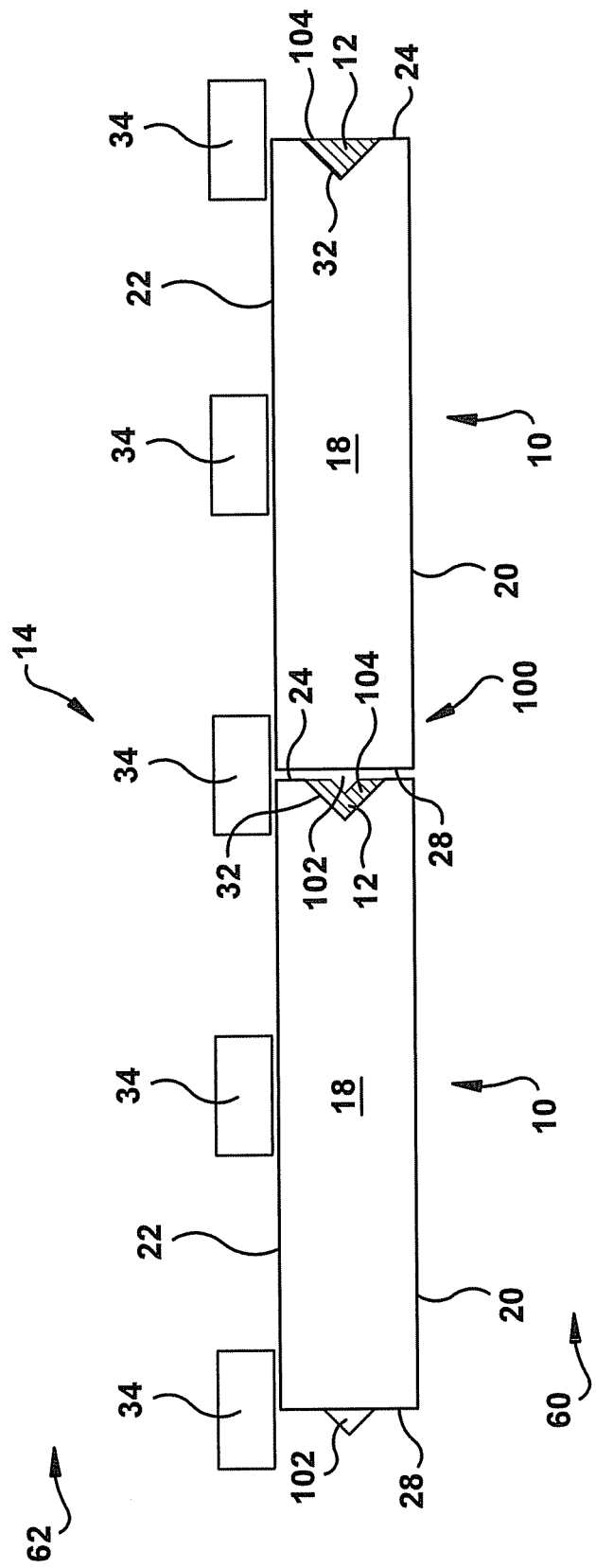
FIG. 17 is a top plan view illustrating assembly of boards with a frame.

Referring to FIGS. 15 and 16, in one exemplary embodiment the boards 18 facilitate tongue and groove connections 100 (See FIG. 17). Each board may include a tongue or projection 102 and a groove or channel 104. The boards 10 with preformed seals 12 are assembled to the frame members 34 with the tongue 102 extending into the groove 104, such that the tongue and groove compress the sealing material 32. The tongue 102 and groove 104 can take a wide variety of different forms and the sealing material 32 may be disposed on the tongue 102 or in the groove 104 or both. In the example illustrated by FIG. 16, the tongue 102 and the groove 104 are triangular in cross-section and the sealing material is disposed in the groove 104. In the example illustrated by FIG. 16A, the tongue 102 and the groove 104 are rectangular in cross-section and the sealing material is disposed in the groove 104. In the example illustrated by FIG. 16B, the tongue 102 has a rounded end 105 and the groove 104 is rectangular in cross-section and the sealing material is disposed in the groove 104. In the example illustrated by FIG. 16A, the tongue 102 and the groove 104 are rectangular in cross-section and the sealing material is disposed on the tongue. Referring to FIG. 17, the board 10 with tongue(s) 102 and groove(s) 104 is secured to the frame members 34 to compress one or more of the preformed seals 12 between a tongue of one board and a groove of another board.

FIGS. 19-26 illustrate exemplary embodiments where sealing material 32 is pre-applied to the front face 20 and/or the back face 22 at one or more of the edges 24, 26, 28, 30 to form the preformed seals 12. The embodiments illustrated by FIGS. 19-26 are especially useful with thin boards. However, the embodiments illustrated by FIGS. 19-26 can be used with boards 18 having any thickness. In the embodiments illustrated by FIGS. 19-26, the board 10 with preformed seals 12 includes a board 18 having first, second, third and fourth edges 24, 26, 28, 30. In the example illustrated by FIG. 19, the sealing material 32 is applied to one face 20 or 22 along all four edges 24, 26, 28, 30. In the example illustrated by FIG. 21, the sealing material 32 is applied to one side 20 or 22 (or both sides) along first and third parallel edges 24, 28. In the example illustrated by FIG. 23, the sealing material 32 is applied to substantially an entire side 20 or 22 (or both sides). In the example illustrated by FIG. 25, the sealing material 32 is applied to both sides 20 and 22 along all four edges 24, 26, 28, 30. In yet another embodiment, the sealing material 32 may be applied to three of the edges. Further, the board 18 may take a wide variety of shapes other than rectangular and the seal material may be applied to any number of the edges of the board 18.

Figure 1A:
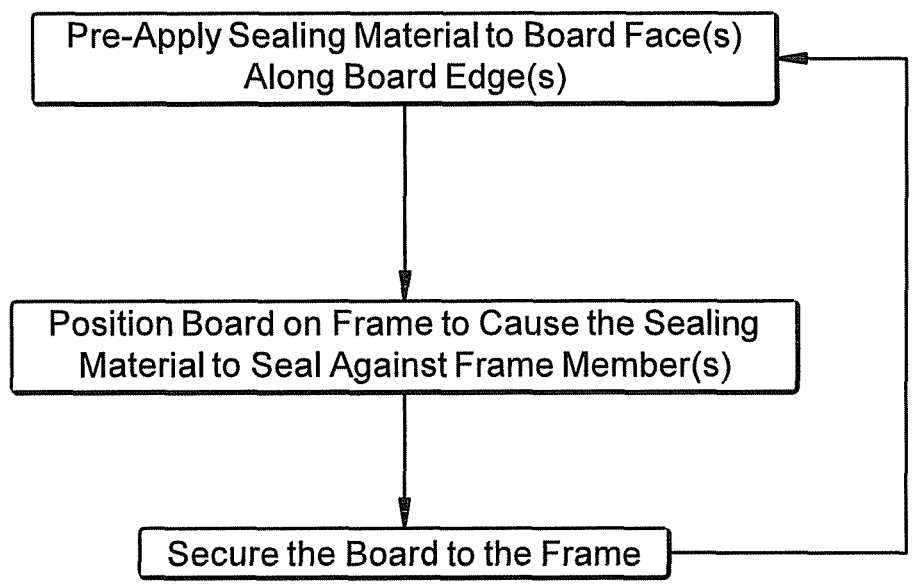
FIG. 1A is a flow chart that illustrates another method of applying a sheathing system to a frame.
Figure 27:
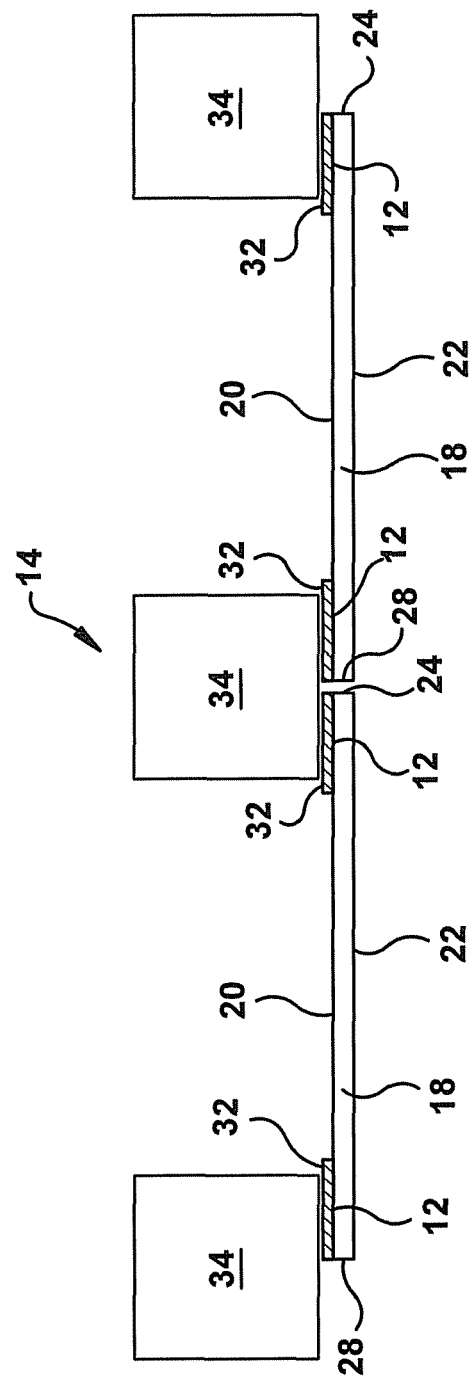
FIG. 27 is a top plan view illustrating assembly of boards with a frame.
Figure 28:
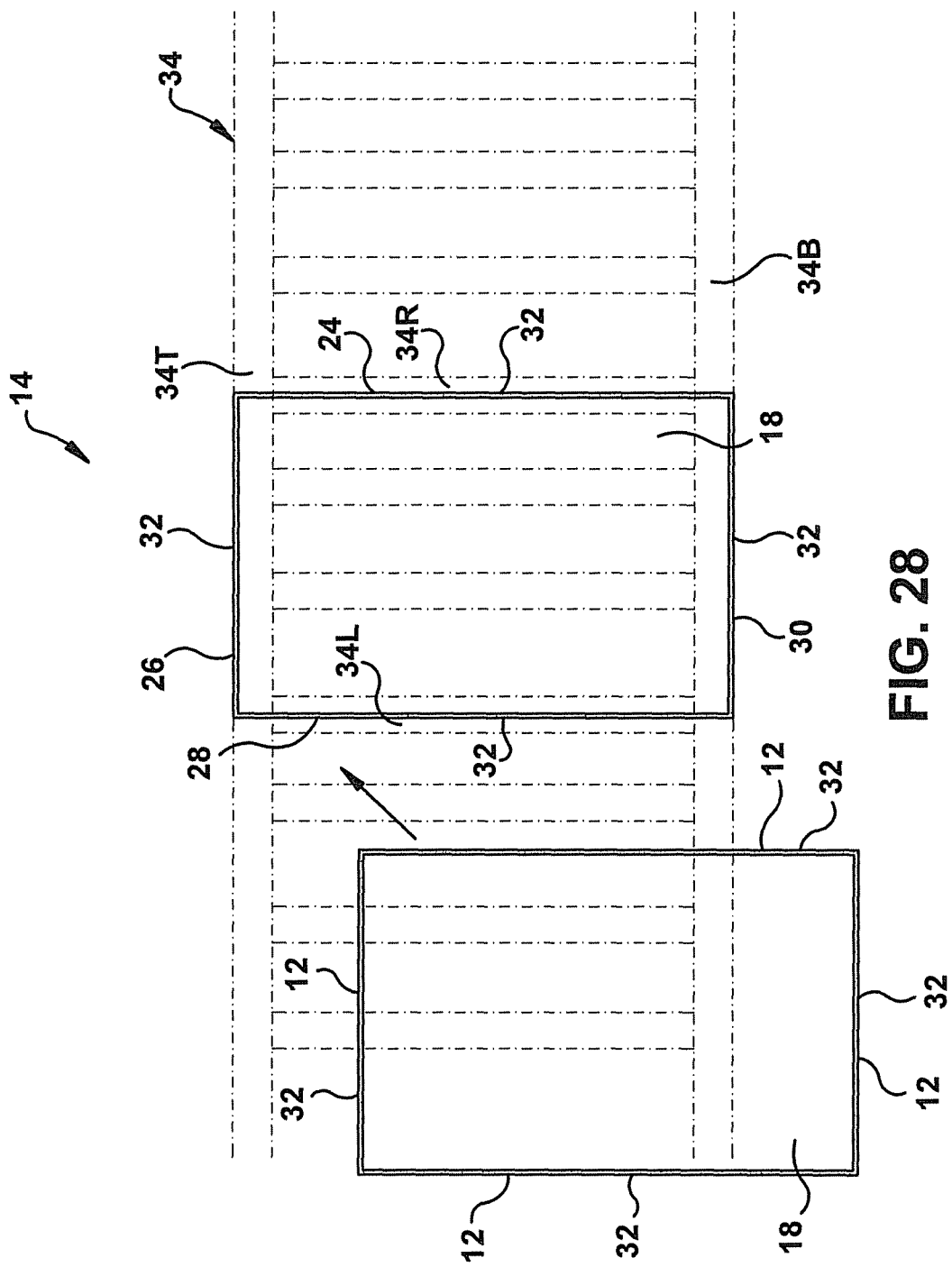
FIG. 28 is a front view illustrating assembly of boards with a frame.

FIGS. 1A, 27 and 28, illustrate an exemplary embodiment of a method for installing boards 10 with preformed seals 12 to form a sealed sheathing system 14. In an exemplary embodiment, sealing material 32 is pre-applied to the side(s) 20, 22 along the edges 24, 26, 28, 30 of the board 18. In an exemplary embodiment, the sealing material 32 is cured to the boards 18 or an adhesive that attach seals 12 to the boards 18 is cured prior to attachment of the board to the frame. The boards 10 with preformed seals 12 may be assembled to the frame 34 with conventional fasteners, such as staples, nails, screws and/or adhesive. Each board 10 with preformed seals 12 is positioned such that the preformed seals seal against the frame 34. In the example illustrated by FIG. 28, seal material 32 along the edge 24 seals against a frame member 34R at the right side of the board, seal material 32 along the edge 26 seals against a frame member 34T at the top of the frame, seal material 32 along the edge 28 seals against a frame member 34L at the left side of the board, and seal material 32 along the edge 30 seals against a frame member 34B at the bottom of the frame. This forms a sealed sheathing system even though the boards may not seal directly to one another. The frame members 34 are aligned with the seal material 32 such that air and water tight seals are formed between the boards 18 and frame members 34 around the perimeter of each board.

Once in position, the boards 10 with preformed seals 12 are secured to the frame members 34. Securing the boards 10 to the frame members permanently sets the relative positions of the boards 10, which in turn makes the seals 12 between the boards 18 and the frame members 34 permanent. This process may be repeated as many times as necessary to form a system 14 that acts as an air and/or moisture barrier.

Any one or more of the features of the different embodiments of boards 10 with preformed seals, sheathing systems 14 and methods 16 disclosed by the application may be used in any combination or sub-combination. Further, while the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A polystyrene board assembly, consisting of:
    a polystyrene foam board having front and back polystyrene faces and first, second, third and fourth polystyrene edges;
    a compressible foam sealing material pre-applied to and in direct contact with the first polystyrene edge to form a preformed seal, and a protective layer provided over the preformed seal;
    wherein the pre-applied compressible foam sealing material contacts only polystyrene and the protective layer over the pre-applied compressible foam sealing material.

2. The polystyrene board assembly of claim 1 wherein said sealing material is cured to the polystyrene foam board to form said preformed seal prior to and remotely from a site where the polystyrene board assembly will be attached to frame members.

3. The polystyrene board assembly of claim 1 wherein the protective layer comprises a film or tape.

4. The polystyrene board assembly of claim 1 wherein the protective layer is removable from the at least one performed seal.

5. A polystyrene board assembly, consisting of:
    a polystyrene foam board having front and back polystyrene faces and first, second, third and fourth polystyrene edges;
    a compressible foam sealing material pre-applied to and in direct contact with the first polystyrene edge to form a first preformed seal and with the second polystyrene edge to form a second preformed seal, and
    a protective layer is provided over the first and second preformed seals;
    wherein the pre-applied compressible foam sealing material contacts only polystyrene and the protective layer over the pre-applied compressible foam sealing material.

6. The polystyrene board assembly of claim 5 wherein said sealing material is cured to the polystyrene foam board to form said preformed seal prior to and remotely from a site where the polystyrene board assembly will be attached to frame members.

7. A polystyrene board assembly, consisting of:
    a polystyrene foam board having front and back polystyrene faces and first, second, third and fourth polystyrene edges;
    a compressible foam sealing material pre-applied to and in direct contact with the first polystyrene edge to form a first preformed seal, with the second polystyrene edge to form a second preformed seal, and with the third polystyrene edge to form a third preformed seal; and
    a protective layer is provided over the first, second, and third preformed seals;
    wherein the pre-applied compressible foam sealing material contacts only polystyrene and the protective layer over the pre-applied compressible foam sealing material.

8. The polystyrene board assembly of claim 7 wherein said sealing material is cured to the polystyrene foam board to form said preformed seal prior to and remotely from a site where the polystyrene board assembly will be attached to frame members.

9. A polystyrene board assembly, consisting of:
a polystyrene foam board having front and back polystyrene faces and first, second, third and fourth polystyrene edges;
a compressible foam sealing material pre-applied to and in direct contact with the first polystyrene edge to form a first preformed seal, with the second polystyrene edge to form a second preformed seal, with the third polystyrene edge to form a third preformed seal, and with the fourth polystyrene edge to form a fourth preformed seal; and
a protective layer is provided over the first, second, third, and fourth preformed seals;
wherein the pre-applied compressible foam sealing material contacts only polystyrene and the protective layer over the pre-applied compressible foam sealing material.

10. The polystyrene board assembly of claim 9 wherein said sealing material is cured to the polystyrene foam board to form said preformed seal prior to and remotely from a site where the polystyrene board assembly will be attached to frame members.

11. A sheathing system comprising:
a first polystyrene board assembly consisting of a first polystyrene foam board having a front polystyrene face, a back polystyrene face and first, second, third and fourth polystyrene edges and compressible foam sealing material;
wherein the compressible foam sealing material is pre-applied to and in direct contact with one or more of the polystyrene edges of the first polystyrene board to form at least one preformed seal;
a second polystyrene board assembly consisting of a second polystyrene foam board having a front polystyrene face, a back polystyrene face and first, second, third and fourth polystyrene edges and compressible foam sealing material;
wherein the compressible foam sealing material is pre-applied to and in direct contact with one or more of the polystyrene edges of the second polystyrene board to form at least one preformed seal;
wherein the first and second polystyrene board assemblies are attached to frame members such that at least a portion of the compressible foam sealing material applied to the one or more of the polystyrene edges of the first polystyrene foam board seals against a respective said polystyrene edge without the compressible foam sealing material of the second polystyrene foam board;
wherein the pre-applied compressible foam sealing material contacts only polystyrene.

12. The sheathing system of claim 11 wherein said compressible foam sealing material is cured to the polystyrene of the first and second polystyrene foam boards prior to attachment of the first or second polystyrene board assemblies to the frame members.

13. The sheathing system of claim 11 wherein the compressible foam sealing material is pre-applied only to the first and second polystyrene edges of the first and second polystyrene foam boards.

14. The sheathing system of claim 11 wherein the compressible foam sealing material is applied directly to all four edges of the first polystyrene foam board.

15. A sheathing system comprising:
a first polystyrene board assembly consisting of a first polystyrene foam board having a front polystyrene face, a back polystyrene face and first, second, third and fourth polystyrene edges and compressible foam sealing material;
wherein the compressible foam sealing material is pre-applied to and in direct contact with one or more of the polystyrene edges of the first polystyrene foam board to form one or more preformed seals, wherein a protective layer is provided over the one or more preformed seals of the first polystyrene foam board; and
a second polystyrene board assembly consisting of a second polystyrene foam board having a front polystyrene face, a back polystyrene face and first, second, third and fourth polystyrene edges and compressible foam sealing material;
wherein the compressible foam sealing material is pre-applied to and in direct contact with one or more of the polystyrene edges of the second polystyrene foam board to form one or more preformed seals, wherein a protective layer is provided over the one or more preformed seals of the second polystyrene foam board; and
wherein the first and second polystyrene foam boards are attachable to frame members such that at least a portion of the sealing material applied to the one or more of the polystyrene edges of the first polystyrene foam board seals against a respective said polystyrene edge without the compressible foam sealing material of the second polystyrene foam board after each of the protective layers are removed from the first and second polystyrene foam boards;
wherein the pre-applied compressible foam sealing material of the first and second polystyrene foam boards contact only polystyrene after each of the protective layers are removed from the first and second polystyrene foam boards.

16. The sheathing system of claim 15 wherein said compressible foam sealing material is cured to the polystyrene of the first and second polystyrene foam boards prior to attachment of the first or second polystyrene board assemblies to the frame members.

17. The sheathing system of claim 15 wherein the sealing material is pre-applied only to the first and second polystyrene edges of the first and second polystyrene foam boards.

18. The sheathing system of claim 15 wherein the sealing material is applied to all four edges of the first polystyrene foam board.

19. The sheathing system of claim 15 wherein the protective layers comprise a film or tape.

20. The sheathing system of claim 15 wherein the protective layers are removable from the preformed seals.

* * * * *